Nov. 19, 1963  O. N. SEELIG  3,110,951
COMBINATION CREEL AND WARPER APPARATUS
Filed Feb. 8, 1962  15 Sheets-Sheet 4

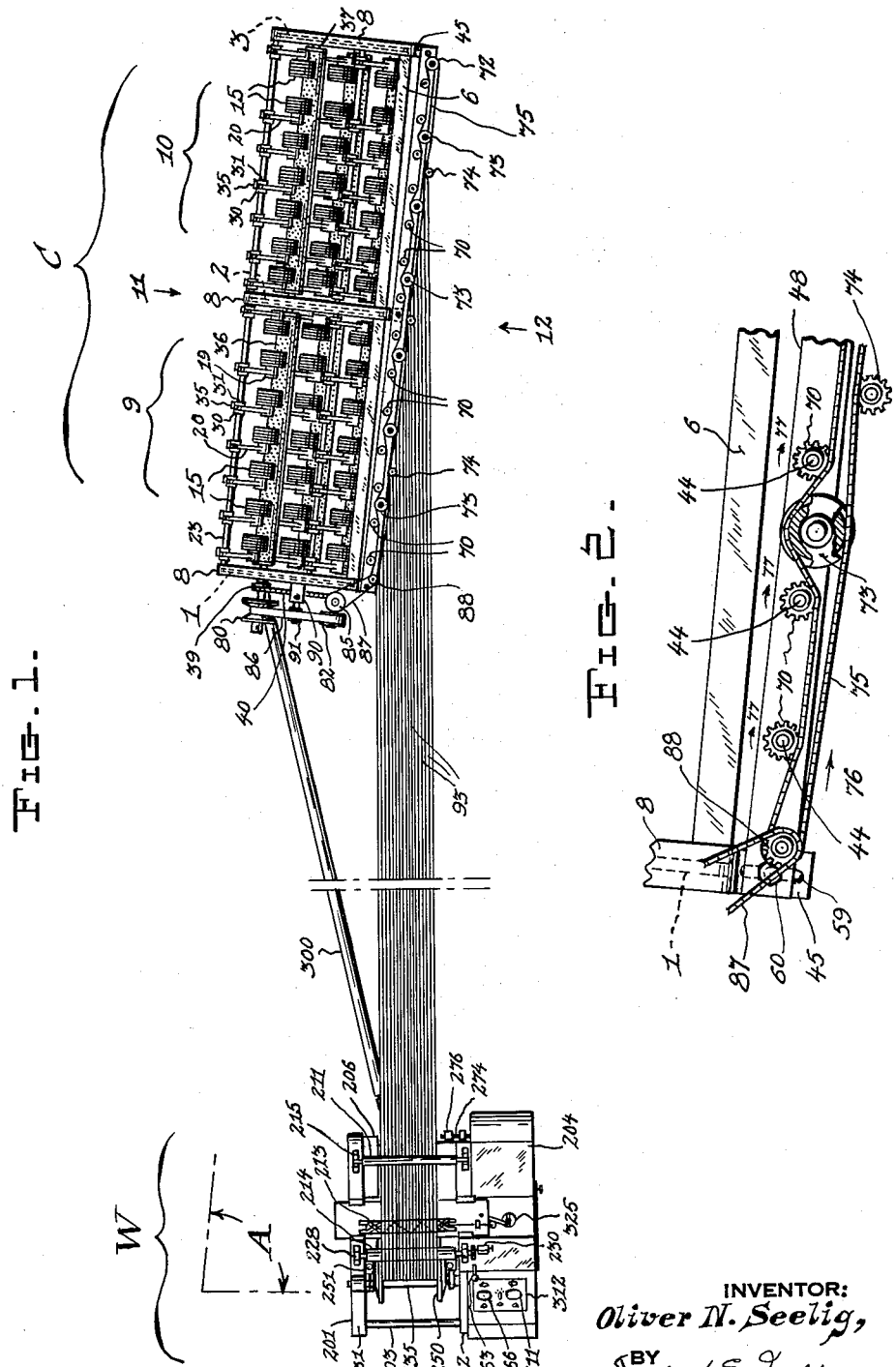

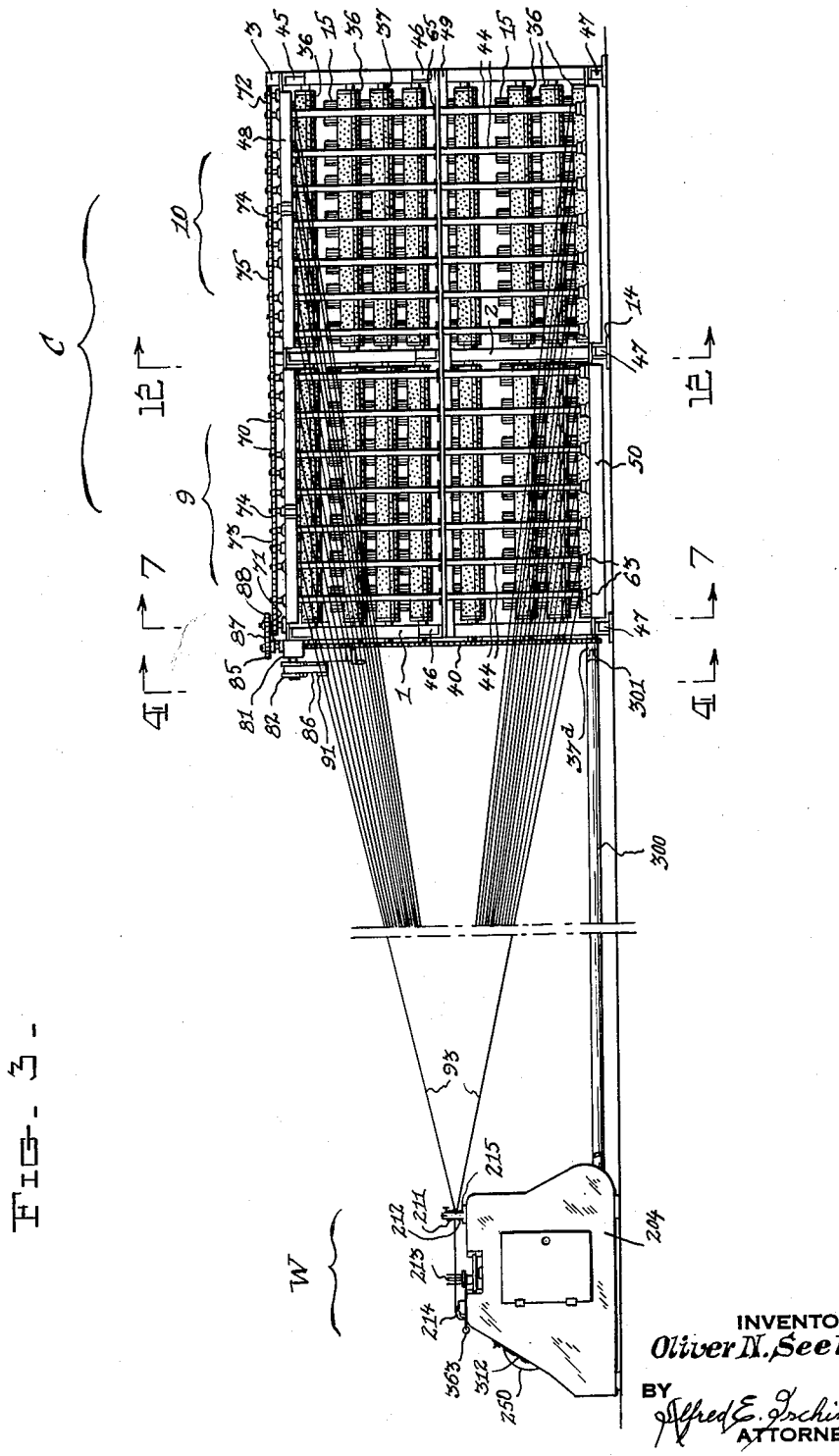

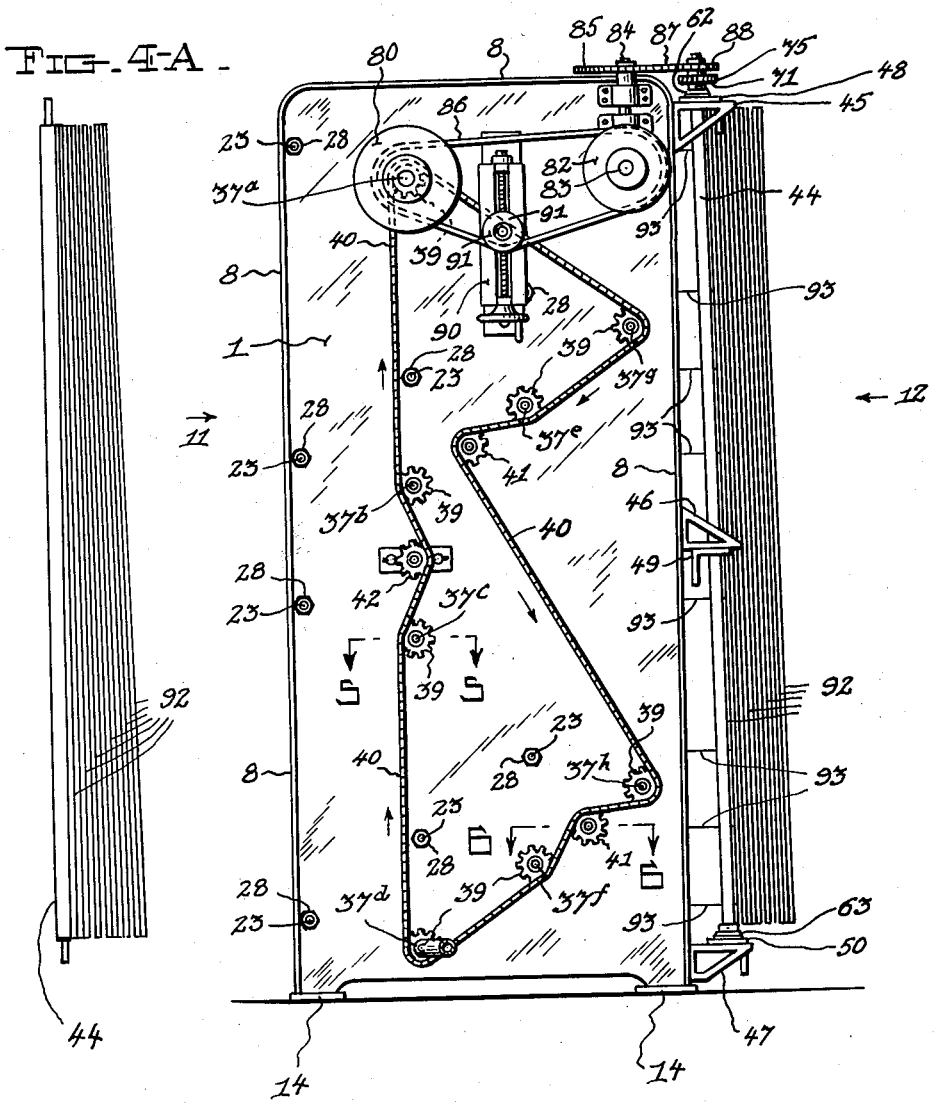

INVENTOR:
Oliver N. Seelig,
BY Alfred E. Ischinger
ATTORNEY.

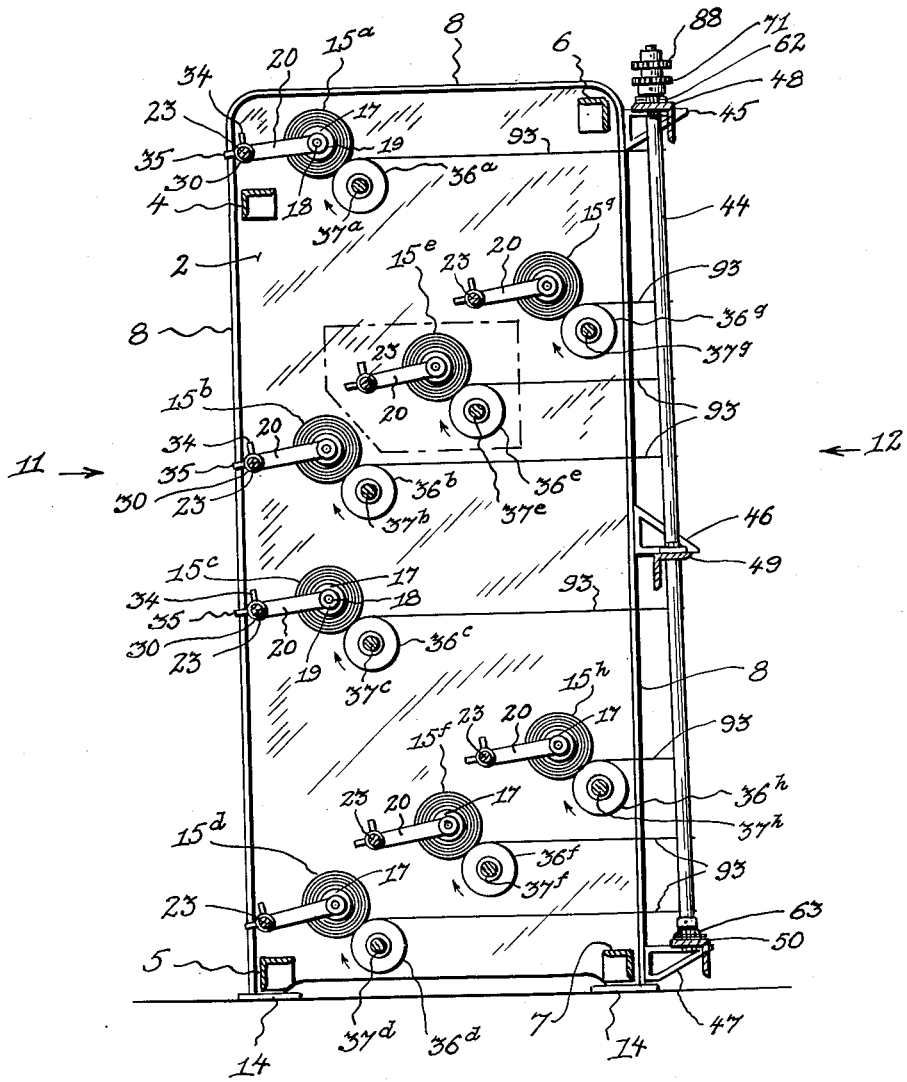

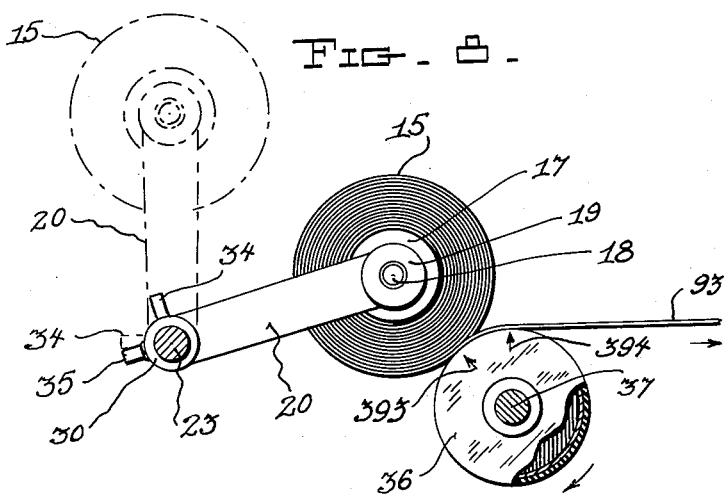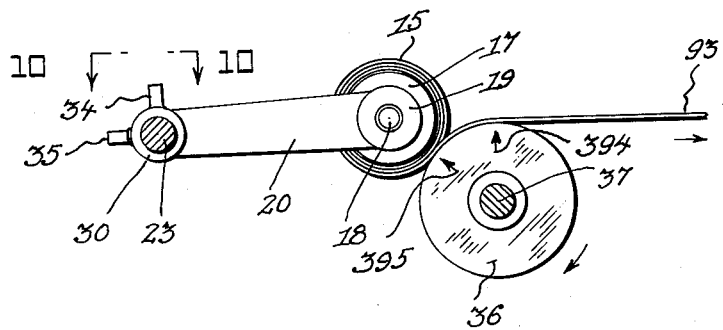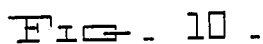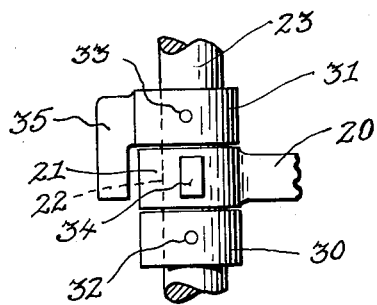

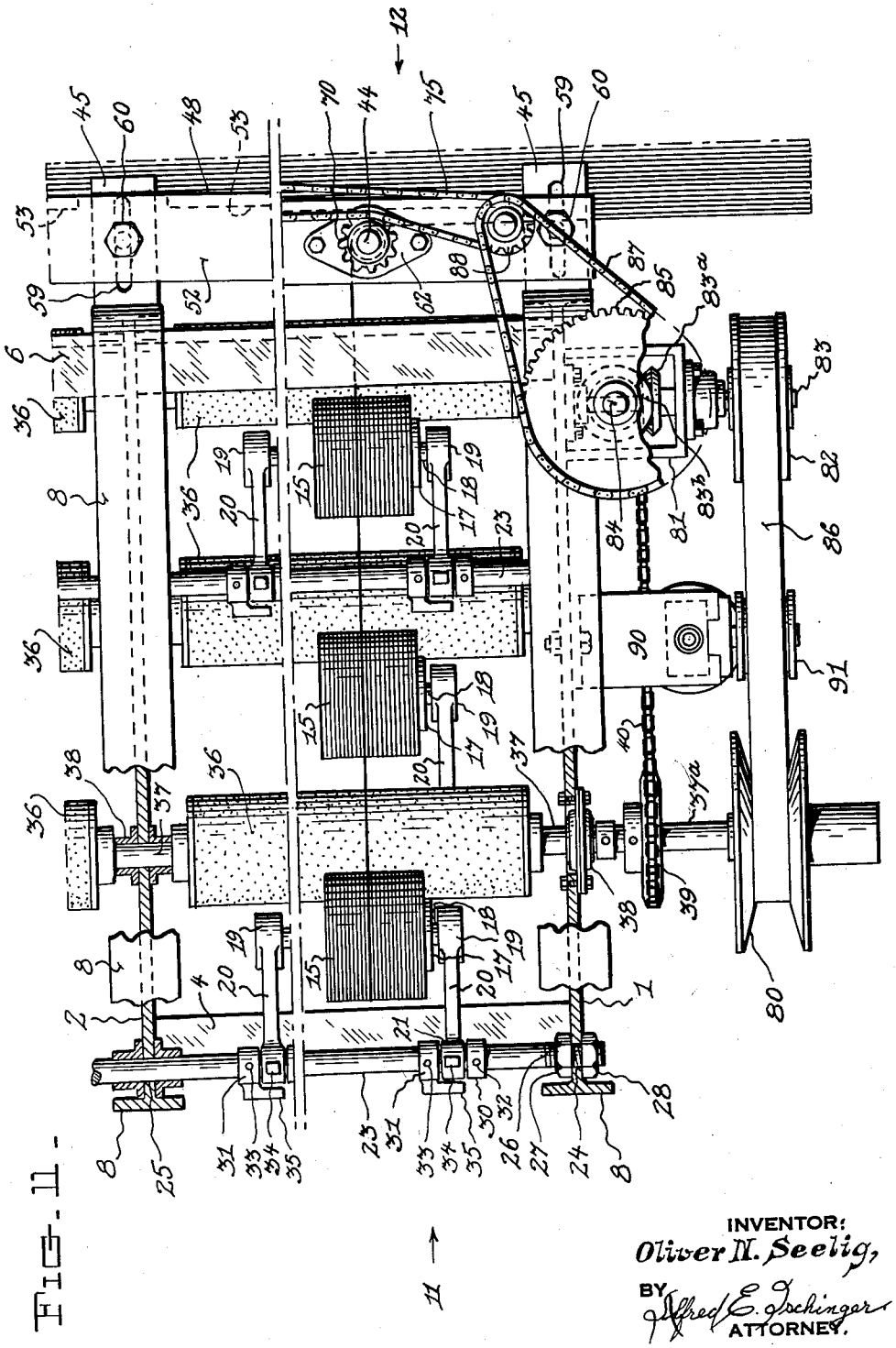

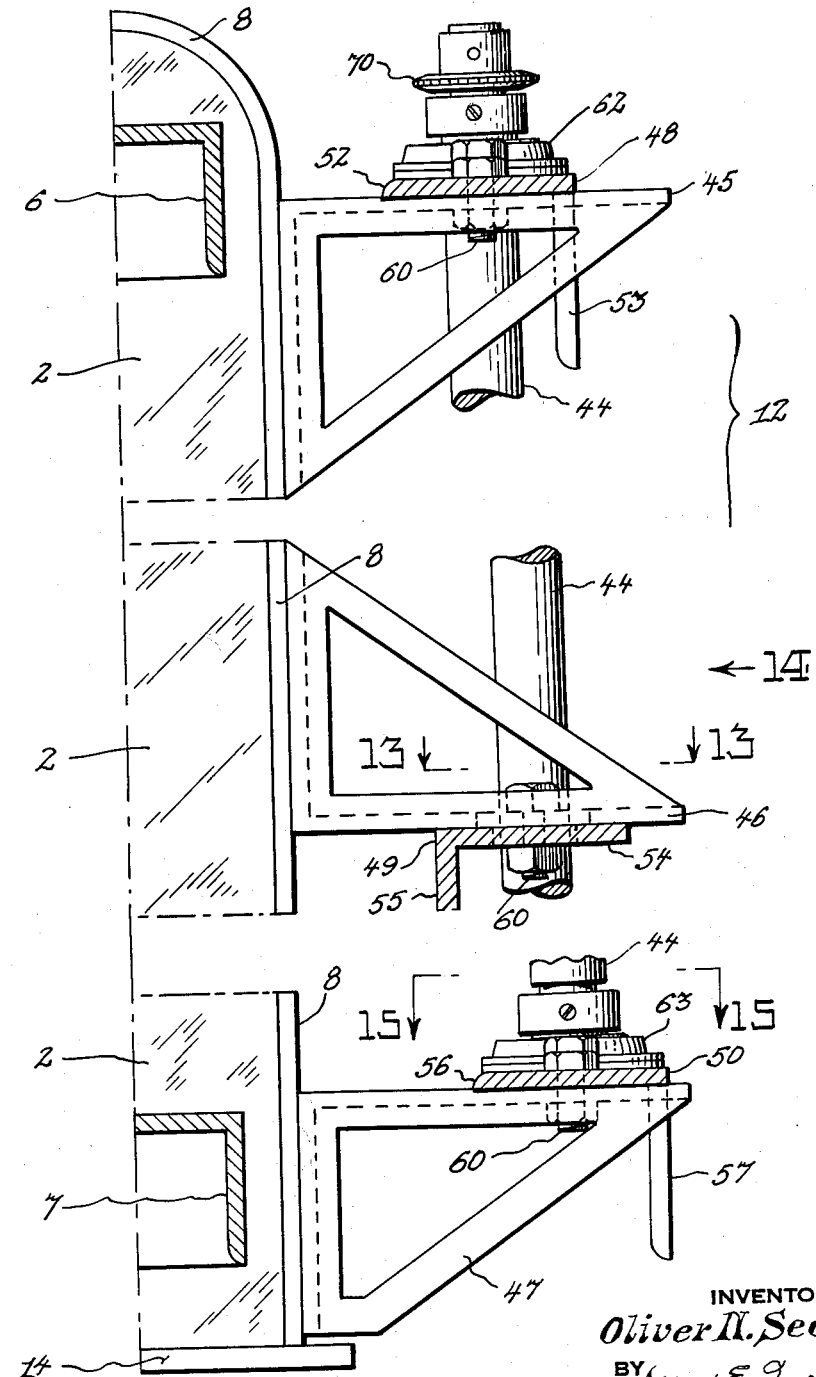

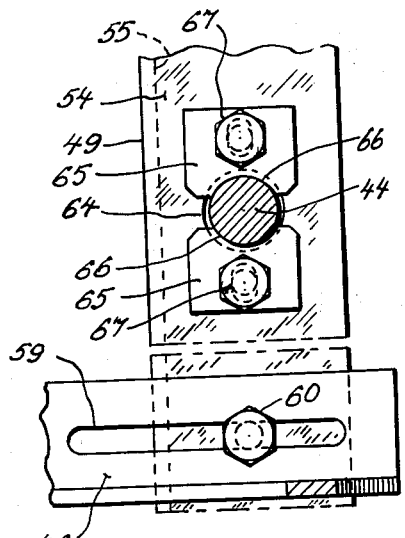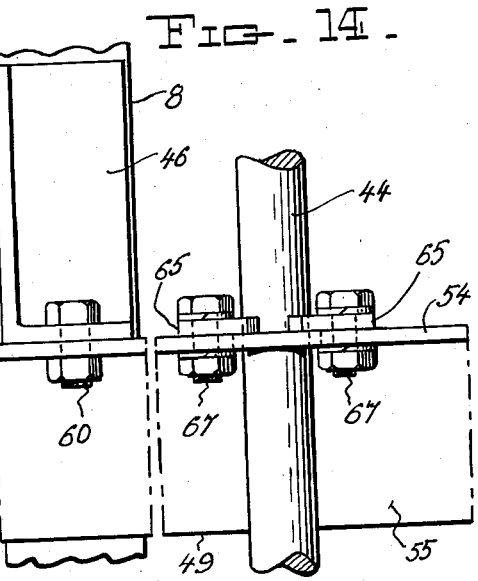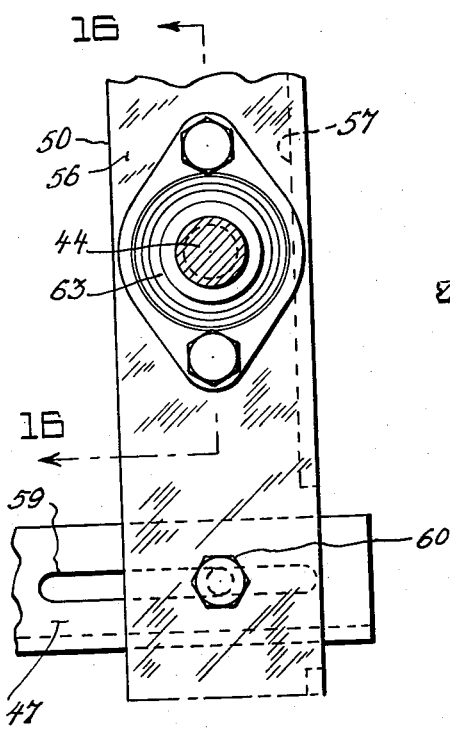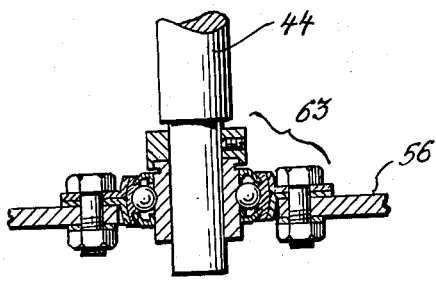

Nov. 19, 1963  O. N. SEELIG  3,110,951
COMBINATION CREEL AND WARPER APPARATUS
Filed Feb. 8, 1962  15 Sheets-Sheet 10

INVENTOR:
Oliver N. Seelig,
BY
Alfred E. Jschinger
ATTORNEY.

Nov. 19, 1963   O. N. SEELIG   3,110,951
COMBINATION CREEL AND WARPER APPARATUS
Filed Feb. 8, 1962   15 Sheets-Sheet 11

INVENTOR:
Oliver N. Seelig
BY Alfred E. Ischinger
ATTORNEY.

Nov. 19, 1963     O. N. SEELIG     3,110,951
COMBINATION CREEL AND WARPER APPARATUS
Filed Feb. 8, 1962     15 Sheets-Sheet 12

INVENTOR:
Oliver N. Seelig,
BY
Alfred E. Ischinger
ATTORNEY

Nov. 19, 1963  O. N. SEELIG  3,110,951
COMBINATION CREEL AND WARPER APPARATUS
Filed Feb. 8, 1962  15 Sheets-Sheet 13

INVENTOR:
Oliver N. Seelig,
BY
Alfred E. Dickinger
ATTORNEY

Nov. 19, 1963     O. N. SEELIG     3,110,951
COMBINATION CREEL AND WARPER APPARATUS
Filed Feb. 8, 1962     15 Sheets-Sheet 14

INVENTOR:
Oliver N. Seelig,
BY Alfred E. Ischinger
ATTORNEY.

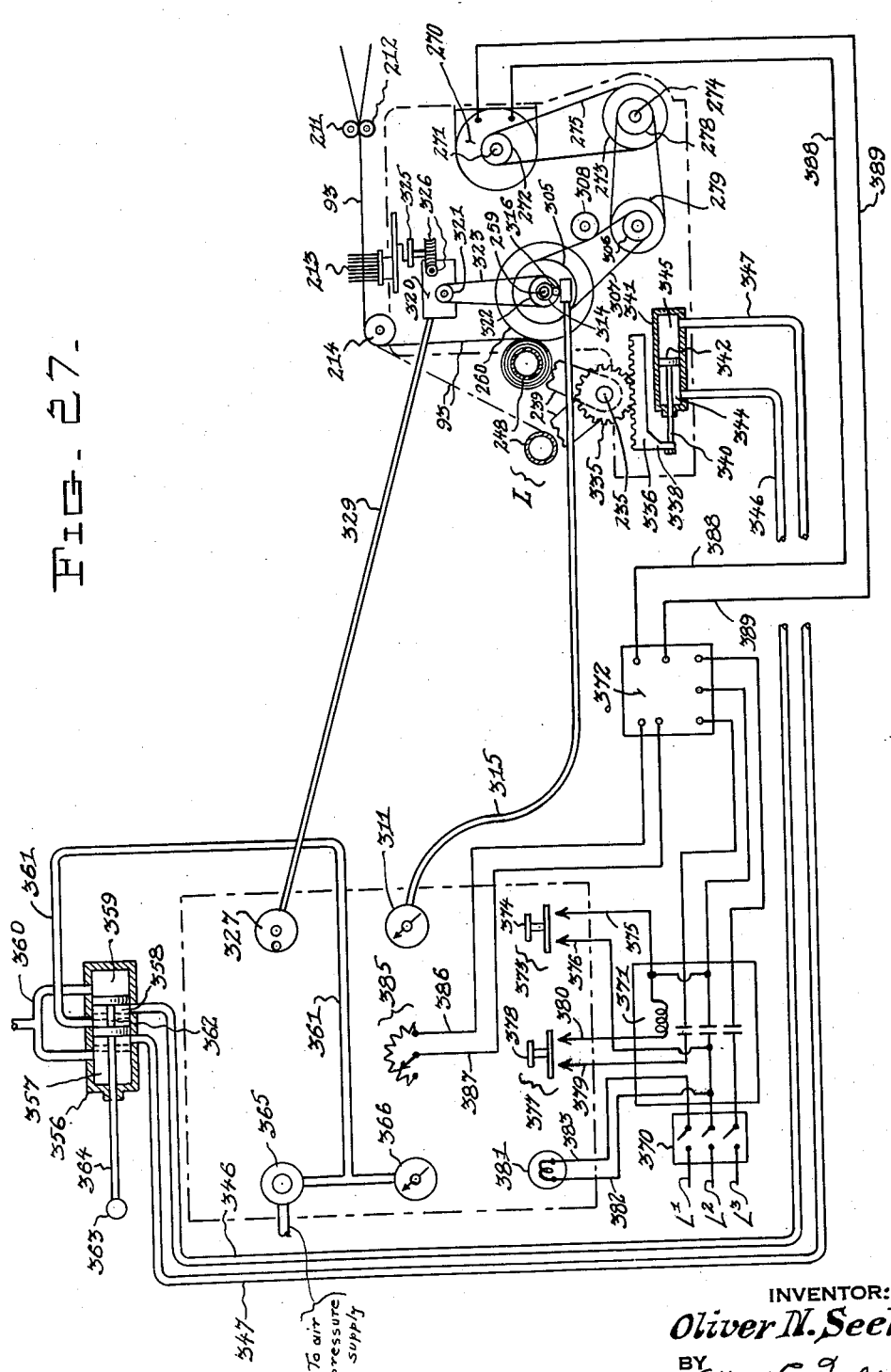

United States Patent Office 3,110,951
Patented Nov. 19, 1963

3,110,951
COMBINATION CREEL AND WARPER
APPARATUS
Oliver N. Seelig, Wyomissing Hills, Pa., assignor to The
Narrow Fabric Company, a corporation of Pennsylvania
Filed Feb. 8, 1962, Ser. No. 171,984
25 Claims. (Cl. 28—36)

This invention concerns a unique combination creel and warper apparatus which is adapted to effect transfer of the yarn from the creel unit to the warper unit in a novel and improved manner.

One object of my invention is to provide a novel apparatus of the type indicated.

Another object is to provide such an apparatus having certain structural and functional features of advantage over the similar type apparatus of the prior art.

A further object is to provide such an apparatus which embodies novel means for precisely controlling the tension of the yarn during its transfer operation from the yarn packages of the creel unit to the warp beam of the warper unit.

Another object is to provide such an apparatus which prevents fibrillation of multifilament yarns during their transfer operation from the yarn packages of the creel unit to the warp beam of the warper unit.

An additional object is to provide such an apparatus in which sliding or rubbing friction of the yarns is substantially entirely avoided by novel yarn deflecting means arranged so that the individual yarns encounter only one non-rotating point of yarn contact during their transfer operation from the yarn packages of the creel unit to the warp beam of the warper unit, which non-rotating point of yarn contact involves a floating action of the yarn between stationary yarn spacing or aligning elements.

An additional object is to provide novel elongated rotatable yarn deflecting rollers at the yarn discharging area of the creel unit, which rollers can be operated at any desired speed and enable arrangement of the yarn packages so as to provide a creel unit of any desired height.

Another object is to provide such an apparatus which can be efficiently operated at a considerably higher production speed than the similar type apparatus of the prior art.

A further object is to provide such an apparatus which, in comparison with the similar type apparatus of the prior art, performs its intended function more economically, effectively and efficiently in that it occupies less floor space, prevents the development of excessive static electricity, embodies special operating means, etc.

Still another object is to provide a new and improved apparatus of the type indicated in which the warper unit is provided with a rotatable warp beam having a yarn receiving surface of substantially the same width as the yarn sheet that is applied thereto and which warp beam is arranged in acute angular relation with the longitudinal axis of the creel unit.

It is also an object to provide such an apparatus in which the creel unit has a plurality of yarn packages rotatably mounted thereon and arranged so that the yarn, as it is being released therefrom, travels toward the warp beam at a predetermined rate of speed, first to a common yarn discharging area located at one side of the creel unit where the yarns are deflected by novel elongated guide elements arranged to vertically extend across the yarn discharging area in such relatively spaced manner that the individual yarns from the yarn packages can be contactingly arranged on the yarn deflecting elements for travel therebeyond toward the warp beam in a substantially parallel relationship with each other and in such order as to effect a yarn sheet formation of substantially the same width as the width of the yarn receiving surface of the warp beam.

It is also an object to provide such an apparatus in which the yarn, during its transfer operation from the yarn packages of the creel unit to the warp beam of the warper unit, encounters only one non-rotatable yarn guide contact device, namely, a zig-zag expansion comb which forms part of the warper unit.

Another feature of the invention resides in a novel arrangement of the yarn packages or bobbins of the creel unit in relation to the frictional drive drum means therefor, which arrangement alleviates yarn strain on the packages, prevents the yarn from being pulled off the packages due to slippage, as well as prevents other detrimental effects from occurring, such as bouncing of the packages during rotation thereof due to package unevenness, yarn spin-off, etc.

With these and other objects in view, which will become more readily apparent from the following detailed description of the practical and illustrative embodiment of the improvements shown in the accompanying drawings, my invention comprises the novel apparatus, elements, features of construction and arrangement of parts in cooperative relationship, as more particularly indicated and defined by the hereto appended claims.

In the accompanying drawings:

FIGURE 1 is a top plan view of one form of combination creel and warper apparatus in accordance with my invention;

FIG. 2 is an enlarged top plan view of a front portion of the creel unit shown in FIG. 1;

FIG. 3 is a front elevational view of the apparatus illustrated in FIG. 1;

FIG. 4 is an elevational view of the creel unit of the apparatus, as seen by looking in the direction of the arrows 4—4 of FIG. 3, with schematic indication of one arrangement of the yarn guide surfaces of the novel elongated yarn guide elements of my invention that extend vertically across the yarn discharging area of the creel;

Figure 5:
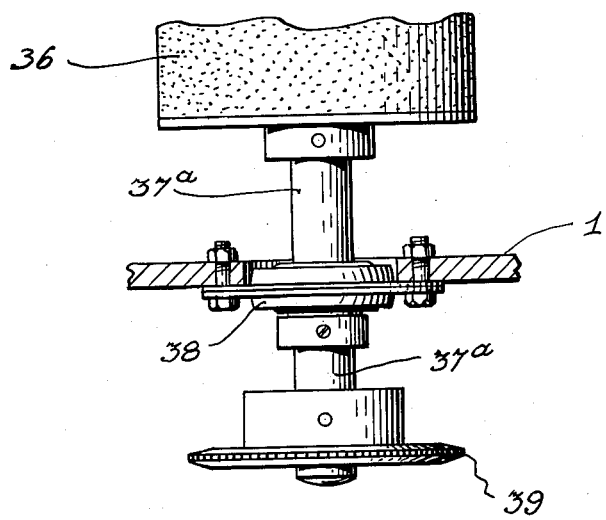
Figure 6:
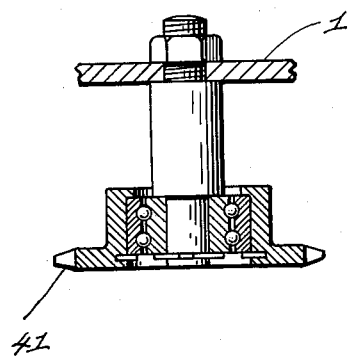
Figure 16:
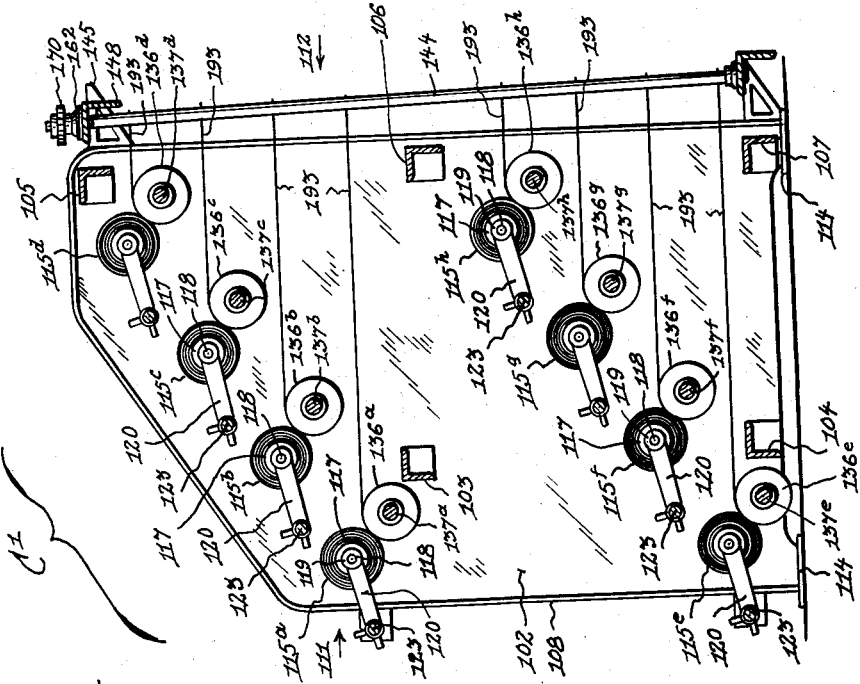
Figure 17:
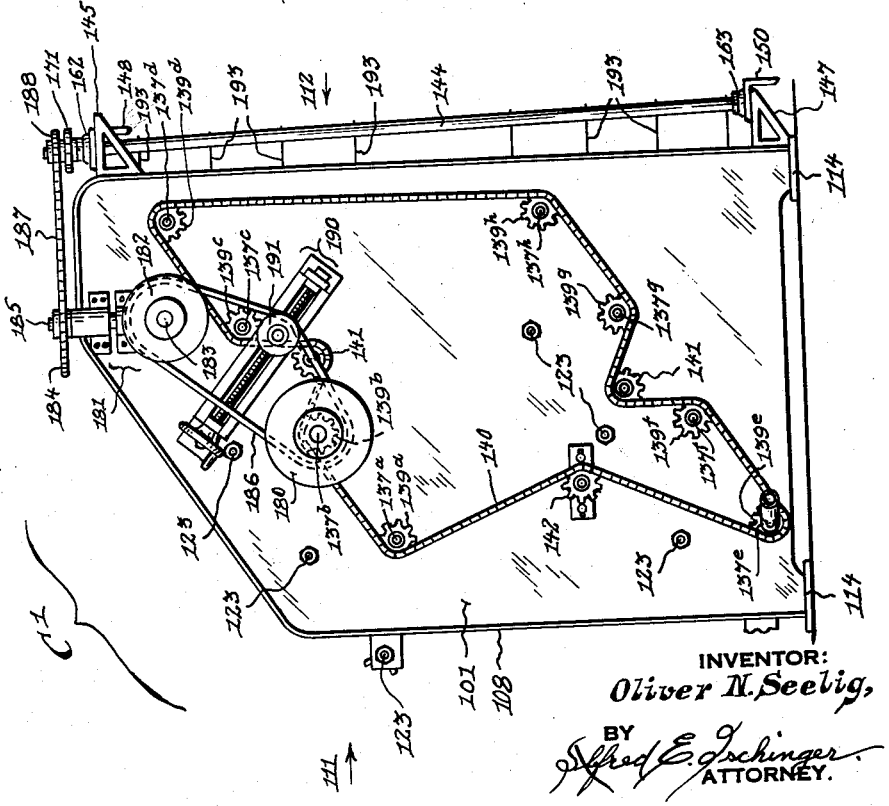
Figure 19:
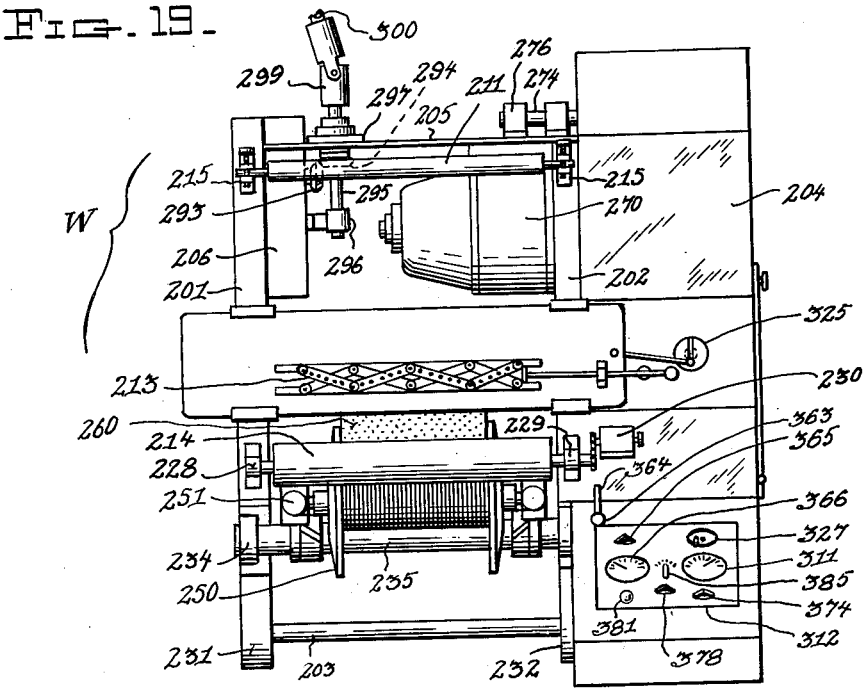
Figure 20:
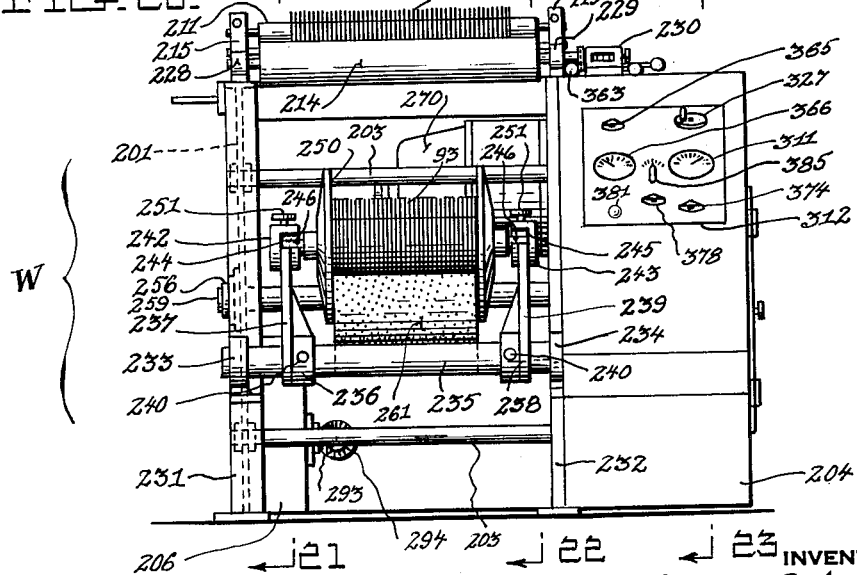
Figure 21:
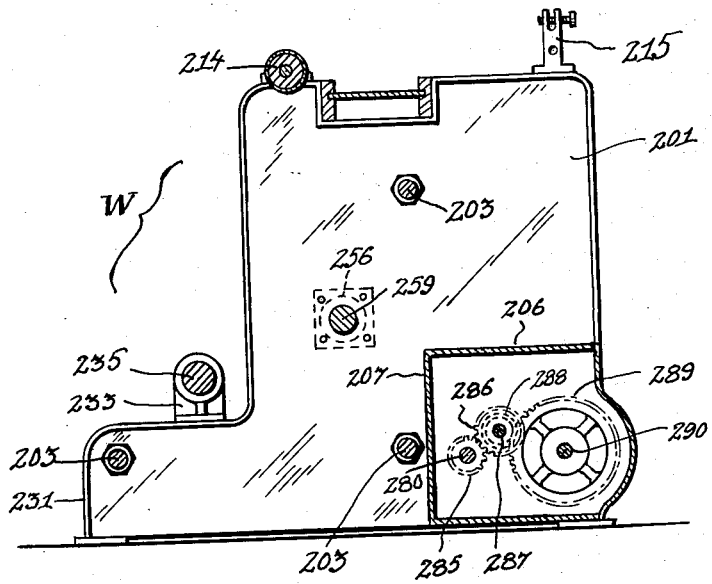
Figure 22:
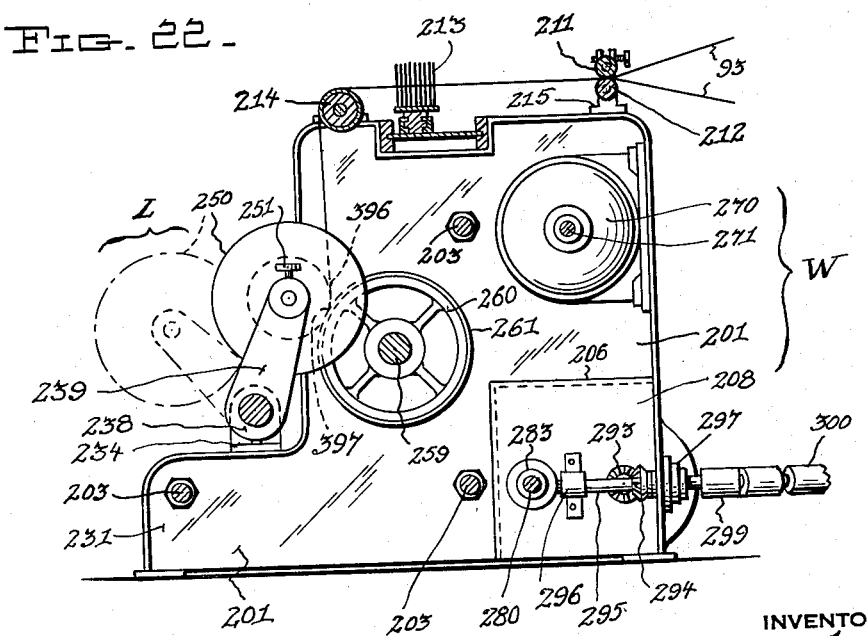
Figure 23:
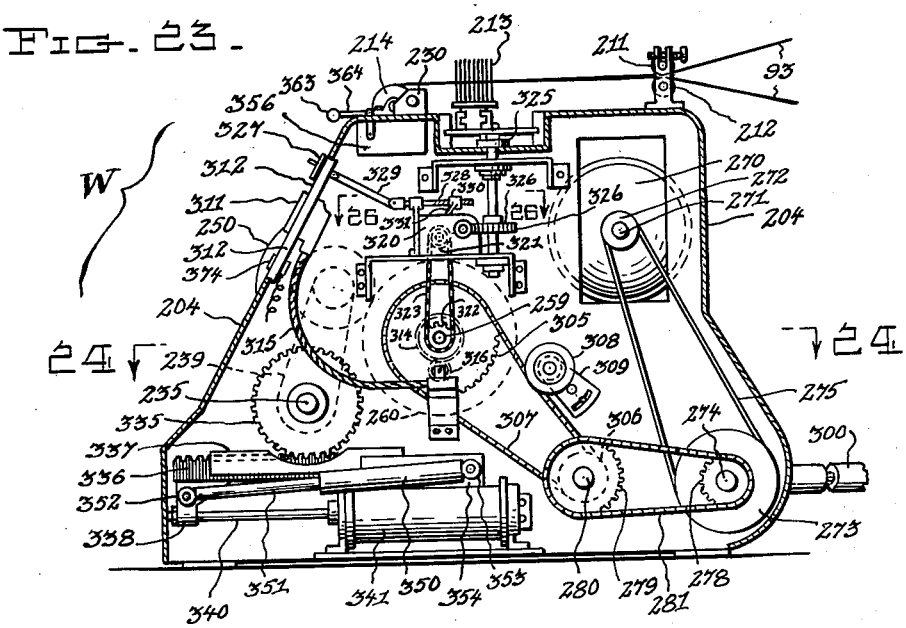
Figure 24:
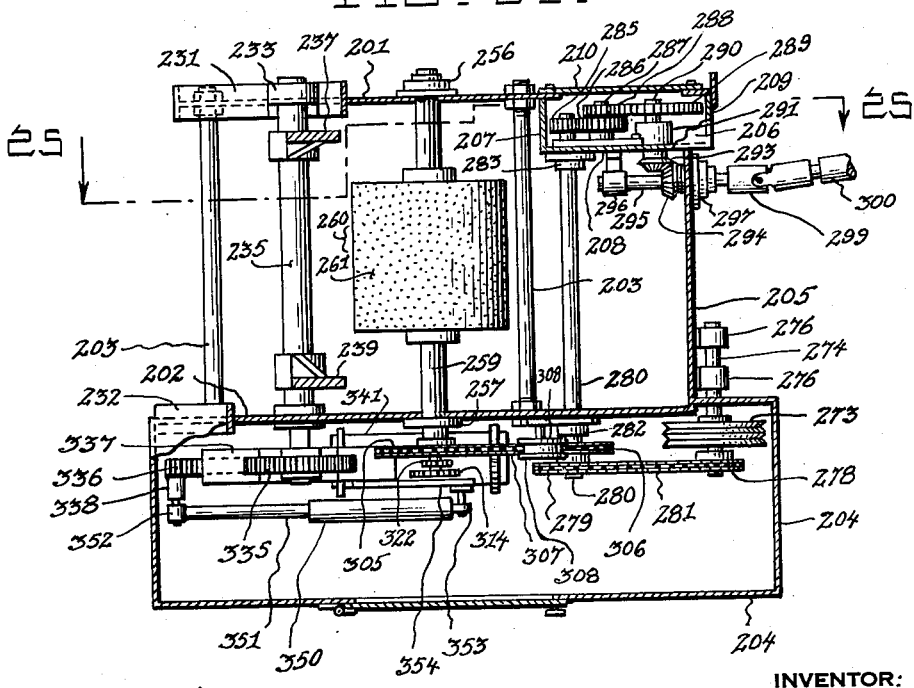
Figure 25:
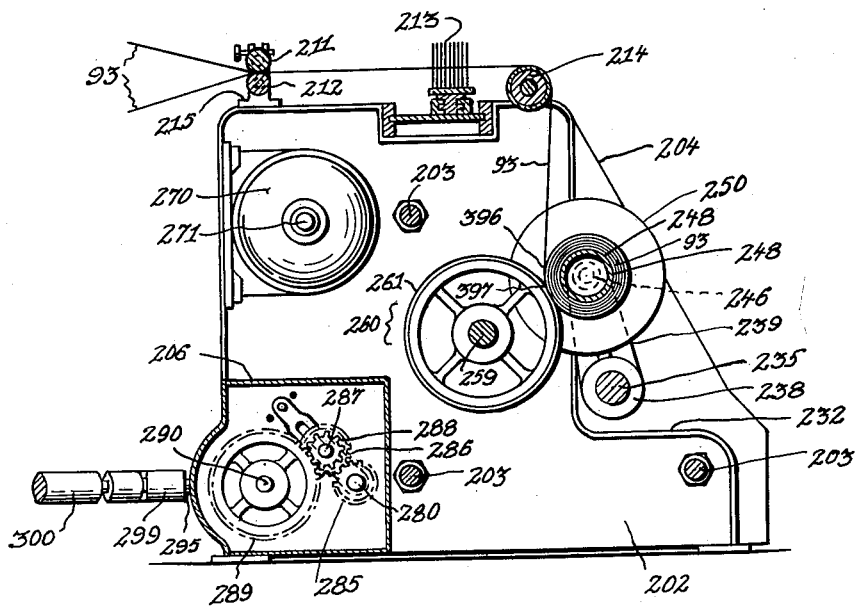
Figure 26:
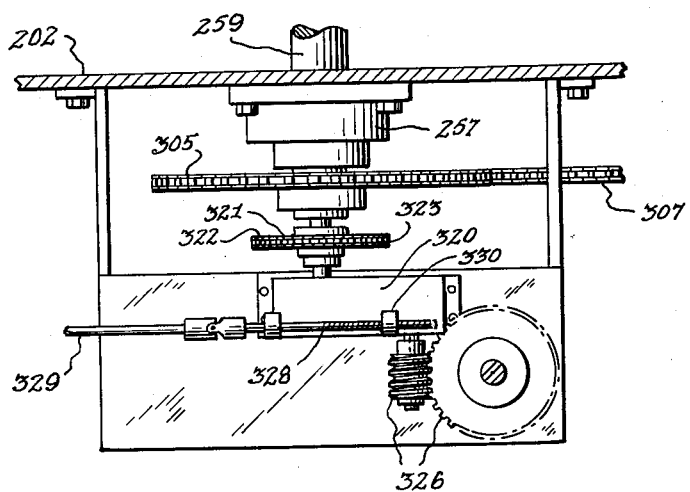

FIG. 4-A is a schematic view, indicating another arrangement of the yarn guide surfaces of said yarn guide elements shown in FIG. 4;

FIG. 5 is a detail sectional view of one of the yarn package drive drum means of the creel, taken substantially as indicated by the arrows 5—5 on FIG. 4;

FIG. 6 is a detail sectional view of a fixed drive chain idler taken substantially as indicated by the arrows 6—6 on FIG. 4;

FIG. 7 is a vertical transverse sectional view of the creel, taken substantially along the line 7—7 of FIG. 3;

FIG. 8 is an enlarged view of the structure portion shown within the dot-and-dash line indicated in FIG. 7, and illustrates a first position of one of the yarn packages;

FIG. 9 is a view similar to FIG. 8 and illustrates a second position of the yarn package;

FIG. 10 is a detail plan view, as seen by looking in the direction of the arrows 10—10 of FIG. 9;

FIG. 11 is an enlarged top plan view of the driving end of the creel unit, and includes a central portion of the unit, certain parts being broken away and in section to show construction details;

FIG. 12 is an enlarged detail elevational sectional view of the novel vertically extending yarn deflecting roller means of my invention and the adjustment means therefor, which view is taken substantially as indicated by the arrows 12—12 on FIG. 3;

FIG. 13 is a horizontal sectional view which more particularly shows a vibration arrester device for one of the yarn deflecting rollers of my invention, as seen by looking in the direction of the arrows 13—13 on FIG. 12;

FIG. 14 is a front elevational view of the structure shown in FIG. 13, as seen by looking in the direction of the arrow 14 on FIG. 12;

FIG. 15 is a horizontal sectional view taken substantially as indicated by the arrows 15—15 on FIG. 12;

FIG. 16 is a vertical sectional view taken substantially as indicated by the arrows 16—16 on FIG. 15;

FIG. 17 is an elevational view, similar to FIG. 4, of a modified form of creel;

FIG. 18 is a transverse sectional view, similar to FIG. 7, but of the modified form of creel indicated by FIG. 17;

FIG. 19 is a top plan view of the warper unit shown at the left hand end portion of FIG. 1;

FIG. 20 is a front elevational view of the warper unit illustrated in FIG. 19;

FIG. 21 is a vertical sectional view taken along the line 21—21 of FIG. 20;

FIG. 22 is a vertical sectional view taken along the line 22—22 of FIG. 20;

FIG. 23 is a vertical sectional view taken along the line 23—23 of FIG. 20;

FIG. 24 is a horizontal sectional view taken along the line 24—24 of FIG. 23;

FIG. 25 is a vertical sectional view taken along the line 25—25 of FIG. 24;

FIG. 26 is a detail horizontal sectional view taken along the line 26—26 of FIG. 23; and FIG. 27 is a partly schematic or diagrammatic view of the control system of the combination creel and warper apparatus.

Referring to the drawings, the new and improved apparatus of the present invention comprises a creel, generally designated by the reference character C and illustrated in FIGS. 1 to 16 inclusive, with which is cooperatively combined a warper, generally designated by the reference character W, and illustrated in FIGS. 1, 3 and 19 to 26 inclusive. In lieu of the preferred form of creel C, if so desired, a modified form of creel, generally designated by the reference character C¹ and illustrated in FIGS. 17 and 18, may be used, as will be pointed out hereinafter.

The creel C, as a unit, is arranged in a predetermined acute angular relationship with respect to the warp beam of the warper W, as shown by the dot-and-dash line "A" in FIG. 1, so that the yarn passing from the yarn discharging side of the creel is delivered to the warper W in the form of a flat yarn sheet of predetermined width, which sheet corresponds substantially with the width of the warp beam.

The creel C comprises a frame formed by a plurality of vertically disposed transverse wall forming members 1, 2 and 3 and a plurality of horizontally disposed longitudinal bars, or angular beams, 4, 5, 6 and 7.

The transverse members 1, 2 and 3 may be shaped as indicated and constructed of sheet metal, or plate steel of suitable gauge, each member having a flange 8 extending around three of its peripheral edges, as more particularly seen in FIGS. 4 and 7.

The creel frame members 1, 2 and 3 are adapted to be arranged in suitable spaced apart relationship lengthwise of the creel, the member 1 being disposed at the end of the creel facing the warper W, the member 3 being disposed at the end of the creel opposite to the end having the member 1, and the member 2 being disposed at an intermediate point between the two members 1 and 3, whereby the creel is divided by the intermediate frame member 2 into two sections, generally indicated at 9 and 10 in FIGS. 1 and 3.

The horizontally disposed longitudinally extending bars 4, 5, 6 and 7 are arranged between the creel frame members 1 and 2 and between the creel frame members 2 and 3, in the manner shown in FIG. 7, in which it will be noted that the bars 4 and 5 are located adjacent to the top and bottom portions respectively of the rear side 11 of the creel, and the bars 6 and 7 are located adjacent to the top and bottom portions respectively of the front or yarn discharging side 12 of the creel. The ends of the bars 4, 5, 6 and 7 are fixedly connected to the creel frame members 1, 2 and 3 in any suitable manner, such as by bolts that extend through transverse end plates, or by welding, so as to provide a rigid frame structure of the creel. Due to the manner in which the bars 4 and 5 are arranged lengthwise of the creel, there is provided a large unobstructed open space at the rear side 11 of the creel so that access can be readily had with the interior of the creel for the purpose to be hereinafter more fully described. The lower portions of the creel frame members 1, 2 and 3 are provided with integral floor engaging pads or feet 14, see FIGS. 4 and 7.

Arranged within the sections 9 and 10 of the creel, between the transverse frame members 1, 2 and 3 respectively, are usual type yarn packages or bobbins 15, see FIG. 8.

These yarn packages 15 are arranged in a plurality of horizontally disposed groups, with the yarn packages of each group arranged in predetermined spaced apart relationship in axial alignment with each other. As shown in FIG. 1, there may be seven yarn packages in each group within each section 9 and 10 of the creel.

Each yarn package consists of a strand of yarn wound upon a core 17 which is rotatably mounted on a spindle 18 carried by one end 19 of a lever or arm 20 (see FIG. 11).

The elongated arm 20 is provided with a hub 21 at its end opposite to the end having the yarn package spindle 18 (FIGS. 8, 9 and 10).

An opening 22 is formed in the hub 21 to receive a rod 23 which extends lengthwise of the two sections 9 and 10 of the creel, between the transverse frame members, and is arranged substantially in parallel relationship with the bars 4, 5, 6 and 7 heretofore described.

The rods 23 are arranged so that the yarn packages 15 will be positioned in three vertical rows, one row being located adjacent to the rear side 11 of the creel, a second row being located adjacent to the front side 12 of the creel, and the third row being located intermediate the front and rear rows, as illustrated more particularly in FIG. 7.

It will be noted that the rear vertical rows of yarn packages, in the two creel sections 9 and 10, are arranged in four horizontal groups of axially aligned yarn packages, as indicated by the reference characters 15ᵃ, 15ᵇ, 15ᶜ and 15ᵈ in FIG. 7, and the other two vertical rows each consist of two horizontal groups of axially aligned yarn packages, one of which is indicated by the reference characters 15ᵉ and 15ᶠ and the other by the reference characters 15ᵍ and 15ʰ, making a total of eight horizontal rows of axially aligned yarn packages, all of which rows are located in different horizontal planes, so as to provide a vertically staggered arrangement by which the yarn packages are disposed so as to establish a determinately spaced vertical and horizontal order of yarn travel from the packages to the yarn discharging area 12 of the creel unit.

Each rod 23 which supports all the arms 20 of each respective group of yarn packages 15 in the eight rows above described, extends in a single length from one end of the creel to the other. One end of each such rod being inserted in an opening 24 formed in the outer creel frame member 1, the intermediate portion of each rod 23 passing through an opening 25 formed in the central creel frame member 2, and the other end of each rod 23 being inserted in an opening (not shown) formed in the outer creel frame member 3 in alignment with the openings 24 and 25.

Each rod 23 is fixedly mounted in position and for this purpose each end portion of each rod is formed with screw threads 26. Engaged on each threaded end portion of each rod 23 is a nut 27 which is screwed up tight against the inside face of the outer creel frame members 1 and 3, and threadedly mounted on the outer end portion of each rod 23 is a second nut 28 which is screwed up tight against the outside face of the members 1 and 3 in the manner shown in FIG. 11.

The hub 21 of each yarn package carrying arm 20 is freely rotatable on its respective rod 23 and in order to retain the arm 20 for each yarn package 15 in a predetermined position on the rod 23, said hub is disposed between a pair of collars 30 and 31 mounted on the rod 23 and fixedly secured thereto by means of pins, set screws, or similar elements 32 and 33, respectively, indicated in FIG. 10.

Normally, each arm 20 is arranged in a generally horizontal position within the creel so as to bring the yarn package 15 mounted thereon into operative relation with a drive drum 36. Each arm 20, with its yarn package 15 thereon, is adapted to be swung upwardly in a counterclockwise direction from the position shown in FIGS. 8 and 9 toward a substantially upright doffing position, as indicated by the dot-and-dash lines in FIG. 8.

The hub 21 is provided with an upstanding lug or finger 34 and the collar 31 is provided with a lug 35 that projects laterally therefrom and is arranged in the path of movement of the lug 34 to thereby engage the latter and limit the extent of rotation of the arm 20 in a counterclockwise direction from the full line position shown in FIGS. 7, 8 and 9 toward the said doffing position indicated in FIG. 8.

Each group of yarn packages within the creel sections 9 and 10 has cooperatively associated therewith a yarn package drive drum 36, which is arranged to support and rotate the yarn packages of the group.

Each drive drum 36 is horizontally arranged in predetermined spaced parallel relationship with the respective rod 23 upon which the several yarn package arms 20 of a certain yarn package group are supported. In this manner the axis of rotation of the yarn packages of said certain group is offset with respect to the axis of rotation of the drive drum 36, for a purpose to be hereinafter more fully described.

As shown in FIGS. 4 and 5, each drive drum 36 is fixedly mounted on a shaft 37 which is supported by self-aligning or other type bearings 38 of standard construction, that are secured by screw bolts or otherwise to the transverse frame members 1, 2 and 3 of the creel, with each shaft 37 arranged so that it extends through said bearings on the transverse frame members and beyond the member 1 as indicated in FIGS. 11 and 5.

From FIG. 7 it will be apparent that the yarn package drive drums 36 are arranged within the creel in three vertical rows, the drive drums of one vertical row being indicated by the reference characters 36$^a$, 36$^b$, 36$^c$ and 36$^d$, the drive drums of the second vertical row being indicated by the reference characters 36$^e$ and 36$^f$, and the drive drums of the third vertical row being indicated by the reference characters 36$^g$ and 36$^h$.

In FIG. 7 the drive drum shafts 37 are identified in corresponding manner, that is to say, the drum shafts of one vertical row are indicated by the reference characters 37$^a$, 37$^b$, 37$^c$ and 37$^d$, the drum shafts of the second vertical row are indicated by the reference characters 37$^e$ and 37$^f$, and the drum shafts of the third vertical row are indicated by the reference characters 37$^g$ and 37$^h$.

At the end of the creel which faces the warper W, each shaft 37 has fixedly secured thereto a similar drive sprocket 39, and all such sprockets 39 are cooperatively engaged by an endless chain 40, in the manner illustrated in FIG. 4.

In order to provide a predetermined tension of the chain 40, a plurality of free running idler sprockets 41 (FIGS. 4 and 6) and an adjustable idler sprocket 42, are mounted on the transverse frame member 1 and arranged in the manner shown in FIG. 4.

As indicated in FIG. 1, the groups of yarn packages 15 within the sections 9 and 10 of the creel may each consist of seven yarn packages arranged in suitable spaced apart relationship in axial alignment with each other.

At the yarn discharging side 12 of the creel there are a plurality of vertically disposed yarn guide elements, in the form of rotatably mounted rollers 44. These rollers 44 are elongated cylinders having smooth exterior surfaces which are located outside of the main frame of the creel and correspond in number with the yarn packages of each group. That is to say, there are seven rollers 44 for the seven yarn packages in each group of section 9, and seven rollers for the seven yarn packages in each group of section 10, making a total of fourteen rollers. As illustrated in FIG. 3, the rollers 44 are arranged in suitable spaced apart relationship lengthwise of the creel, in alignment with the yarn packages 15, said rollers being adjustably mounted on suitable supporting means to be next described.

As shown in FIG. 12, at the yarn discharging side 12 of the creel unit, the transverse frame members 1, 2 and 3 have fixedly mounted on the vertical portions of their flanges 8, upper brackets 45, intermediate brackets 46, and lower brackets 47.

The upper brackets 45 provide means for supporting an elongated horizontally disposed structural steel member 48 which is arranged lengthwise of the creel in the manner illustrated in FIGS. 1, 3, 4, 7, 11 and 12.

A second elongated horizontally disposed structural steel member 49 is supported from the intermediate brackets 46, and a third elongated horizontally disposed structural steel member 50 is supported by the lower brackets 47, as shown in FIGS. 3, 4, 7 and 12.

The said structural steel members 48, 49 and 50 may be constructed of angle stock so that there will be provided a horizontal web portion and a vertical web portion.

Thus, as shown in FIG. 12, the member 48 has a flat horizontal portion 52 and a vertical portion 53 depending therefrom. In a like manner the member 49 has a flat horizontal portion 54 and a vertical portion 55 depending therefrom, and the member 50 has a flat horizontal portion 56 and a vertical portion 57 depending therefrom. Since the members 48, 49 and 50 span a considerable distance between their respective supporting brackets 45, 46 and 47, the vertical portions 53, 55 and 57 provide means for preventing sagging or deflection of said members in a downward direction between their respective supporting brackets, and the horizontal portions 52, 54 and 56 provide means for engaging a body portion of the brackets 45, 46 and 47 respectively, whereby the members 48, 49 and 50 are supported thereon.

Each bracket 45, 46 and 47 is provided with an elongated slot 59, which is arranged in the manner shown in FIGS. 11, 13 and 15 so as to extend lengthwise of the brackets in a direction outwardly from the flanges 8 of the creel frame members 1, 2 and 3.

The members 48, 49 and 50 have associated therewith bolts 60, each bolt having a threaded shank mounted in a slot 59 and arranged to receive a nut at the lower portion thereof which, when turned up on the shank of the bolt in the manner illustrated in FIG. 12, clamps the therewith associated parts together.

The slots 59 in the brackets 45, 46 and 47, together with the bolts 60, provide means by which the sections of the members 48, 49 and 50 that are connected with the brackets 45, 46 and 47, may be arranged in a predetermined angular relationship with respect to the main body of the creel at the yarn discharging side 12 thereof. Also, the angular arrangement of each member 48, 49 and 50 relative to each other may be varied in the manner to be hereinafter more fully described.

Referring now to FIGS. 1, 2, 11 and 12, each yarn guide roller 44 has an upper end portion provided with a shaft section which is rotatably mounted in a self aligning bearing 62, fixed to the part 52 of the member 48, and has a lower end portion provided with a shaft section which is rotatably mounted in a self aligning bearing 63 fixed to the part 56 of the member 50 (see also FIGS. 12, 15 and 16).

The upper and lower bearings 62 and 63 of the yarn guide rollers 44, as well as the bearings 38 of the yarn package drive drum shafts 37, may be of the well known self aligning type available on the open market and sold under the trade name "Fafnir Flangettes." For further information concerning the construction and functioning of such bearings, reference may be had to Catalog No. 480, issued by the Fafnir Bearing Company, of New Britain, Connecticut, or to the patents and other literature available to the public which relate to such type bearings.

The intermediate portion of each roller 44 extends through an opening 64 in the section 54 of the member 49, said opening having an area larger than the diameter of the roller, so that there is not any contact of the roller directly with the wall of the opening 64.

Mounted on the portion 54 of the member 49 is a pair of elements 65, which are diametrically arranged in spaced apart relationship at opposite sides of the roller 44.

An arcuate notch 66, formed in an end portion of each element 65, is arranged to receive the roller 44 in the manner illustrated in FIG. 13, whereby the roller is engaged by the two elements 65 and steadied intermediate its length so that vibrations of the roller are arrested and dampened when the creel is in operation.

The elements 65 are preferably constructed of suitable plastic bearing material, such as Micarta, or a similar material possessing a stiff anti-friction body, and said elements are fixedly held in place on the member 49 by means of bolts or other fastening means 67. It will be understood that the construction and arrangement of the parts is such that the relative position of the elements 65 with the intermediate section of the roller 44 can be adjusted when the parts become worn.

The shaft section at the upper end of each roller 44 has a sprocket 70 mounted thereon, as shown in FIG. 12.

Since the rollers 44 are arranged in spaced apart relationship, the sprockets 70 of said rollers extend in a generally straight line lengthwise of the creel in the manner shown in FIGS. 1 and 2.

Mounted on the upper angle member 48 and arranged adjacent to each end thereof, are stud shafts having sprockets 71 and 72 thereon, respectively, the sprocket 71 being located adjacent to the end of the creel having the frame member 1, and the sprocket 72 being located adjacent to the end of the creel having the frame member 3 (see FIGS. 1 and 2).

Also mounted on the upper angle member 48 and arranged in suitable spaced apart intervals in a staggered relation with the sprockets 70, are stud shafts having idler rollers 73 and roller sprockets 74 mounted thereon.

An endless chain 75 is trained over the sprockets 70, 71, 72 and 74 and idler rollers 73 in the manner illustrated in FIGS. 1 and 2 so that movement of the chain 75 in the direction of the arrow 76 (FIG. 2) imparts rotation to all of the rollers 44 in the direction of the arrows 77.

It will be understood that the idler rollers 73 and idler sprockets 74 are arranged to guide and maintain the chain 75 in cooperative relationship with the sprockets 70 of the rollers 44.

As previously explained, the yarn package drive drums 36 are rotated by means of an endless chain 40 trained over the drive sprockets 39 mounted on the outer end portion of the drum shafts 37 in the manner illustrated in FIGS. 4, 5 and 11.

For the purpose of operating the yarn guide rollers 44 at a predetermined number of revolutions per minute and in a definite relation with the surface speed of the yarn packages 15 and the surface speed of the warp beam, in the manner to be hereinafter more fully described, a driving connection is provided between the yarn package operating mechanism and the yarn guide rollers operating mechanism.

As shown in FIGS. 4 and 11, the shaft 37 is provided with an extension 37a at the upper left hand corner portion of the creel which extends outwardly from the creel frame member 1 for a suitable distance to provide means upon which there is mounted a grooved pulley 80.

At a suitable point adjacent to the upper right hand corner portion of the creel frame member 1 (see FIGS. 4 and 11), a suitable power transmitting unit is mainly supported on a mounting 81 that is secured to the frame member 1.

The power transmitting unit comprises a grooved pulley 82 mounted on a horizontally disposed shaft 83 to which is secured a bevel gear 83a that cooperates with a bevel gear 83b fixed on a vertical shaft 84 to which is fixedly attached a sprocket wheel 85. In this manner, rotation of the shaft 83 imparts rotation to the shaft 84.

An endless belt 86 operatively connects the pulley 80 with the pulley 82, and an endless chain 87 operatively connects the sprocket wheel 85 with a sprocket 88 that is secured to the shaft of the sprocket 71 heretofore referred to.

An adjustable belt tightening device 90 is mounted on the creel frame member 1 in the manner illustrated in FIGS. 4 and 11. The device 90 has an idler wheel 91 engaging the drive belt 86 to maintain said belt at the desired tension in the manner more particularly illustrated in FIG. 4.

As shown more particularly in FIGS. 1, 2, 4, 7 and 12, the rollers 44 are arranged to extend vertically across the yarn discharging side 12 of the creel unit C at a slight angle with respect to the vertical portions of the flanges 8, of the frame members 1, 2 and 3, in the manner schematically indicated at the right end of FIG. 4. That is to say, the upper roller bearing supporting member 48 is arranged closer to the flanges 8 than is the lower roller bearing supporting member 50 (see FIG. 12), so that the rollers 44 are so angularly positioned that the exteriors thereof provide suitably inclined surfaces 92 for supporting, deflecting and guiding the yarn portions 93 which extend from the yarn packages 15 to the rollers 44. Also, since the members 48, 49 and 50 are angularly disposed relative to the plane of the yarn discharging side 12 of the creel, as shown in FIGS. 1 and 2, with the ends of said members arranged a closer distance from the flange 8 of the creel frame member 1, than is the distance that said members are spaced from the flange 8 of the frame member 3 at the rear end of the creel, the yarn guide surfaces 92 of the successive rollers 44, as schematically indicated in FIG. 4, are in a progressively spaced order relative to each other, as said surfaces extend from the front end creel frame member 1 toward the rear end creel frame member 3 of the creel unit C.

It will be noted that the arrangement of the rollers 44 with respect to the arrangement of the yarn packages 15 is such that each of the yarn portions 93 that extend from the yarn packages 15, are deflected by the rollers 44 a little beyond the yarn directly above it, and that due to the angular arrangement of the rollers 44, said rollers consequently effect a yarn sheet emanating from the creel which is of substantially the same width as the yarn receiving surface of the warp beam of the warper unit, as will be hereinafter more particularly pointed out.

By referring to the schematic illustration of the surface arrangement of the rollers 44, as indicated in FIG. 4–A, it will be noted that, if desired, the rollers 44, instead of having their yarn deflecting surfaces 92 arranged in parallelism as schematically indicated at the right end of FIG. 4, may be arranged so that said yarn deflecting surfaces 92 fan out, more or less, from the top to the bottom thereof. In this manner, the spacing between the yarns and the width of the yarn sheet can be varied, as desired, between the inclination limits of the rollers 44.

Under certain conditions it is desirable to provide a creel unit embodying the elements of construction heretofore described arranged in such a manner that the overall height of the creel is less than the height of the creel C.

Referring to FIGS. 17 and 18, the creel $C^1$ comprises a frame formed of a plurality of vertically disposed transverse members, an end member 101 being illustrated in FIG. 17 and an intermediate member 102 being illustrated in FIG. 18. The members 101 and 102 are the equivalent of the members 1 and 2 heretofore described, and said members 101 and 102 are connected together by a plurality of horizontally disposed longitudinal bars 103, 104, 105, 106 and 107 in the manner illustrated in FIG. 18.

The transverse frame members 101 and 102 are constructed of sheet metal or plate steel of suitable gauge, each member having a flange 108 extending around its peripheral edges, with the exception of the bottom edge, which is flangeless.

The transverse frame members are adapted to be arranged in spaced apart relationship lengthwise of the creel $C^1$ in a similar manner to that heretofore described in connection with the description of the creel C, so that the creel $C^1$ is provided with two sections, corresponding substantially with the sections 9 and 10 heretofore described.

The horizontally disposed longitudinally extending bars 103 and 104 are arranged adjacent to the rear side 111 of the creel $C^1$, and the bars 105, 106 and 107 are located adjacent to the front or yarn discharging side 112 of the creel. The ends of the bars are fixedly connected to the transverse frame members in any suitable manner, such as by screw bolts or welding, so as to provide a rigid frame structure of the creel. The lower portions of the transverse frame members are provided with floor engaging pads or feet 114.

As shown in FIG. 18, the main difference between the creel C and the creel $C^1$ is the arrangement of the yarn packages and their drive drums.

The yarn packages 115 are in a plurality of horizontally disposed groups, with the yarn packages of each group arranged in predetermined spaced apart relationship and in axial alignment with each other as has been heretofore described.

Each yarn package consists of yarn wound upon a core 117 which is rotatably mounted on a spindle 118 carried by one end 119 of a bracket 120.

Each bracket 120 is in the form of an elongated arm and is provided with a hub at its end opposite to the end having the yarn package spindle 118.

An opening is formed in said hub to receive a rod 123 which extends lengthwise of the creel. The rods 123 are so arranged that the yarn packages consist of two assemblages, each assemblage including four rows of yarn packages. One assemblage of four rows of yarn packages is arranged in the upper portion of the creel $C^1$, and the second assemblage of four yarn packages is arranged in the lower portion of the creel.

The upper assemblage of yarn packages is arranged in an inclined plane extending upwardly from the rear side 111 toward the front or yarn discharging side 112 of the creel. In this way, the yarn packages $115^a$ of the rear row are located in a horizontal plane lower than the location of the yarn packages $115^d$ of the front row, and the yarn packages $115^b$ and $115^c$ of the intermediate rows are so located with respect to the rear row of yarn packages $115^a$ and the front row of yarn packages $115^d$ that the axes of the four rows of yarn packages are in a substantially straight line which is at an angle with respect to the horizontal base of the creel.

In a similar manner the second assemblage of yarn packages is arranged in an inclined plane extending upwardly from the rear side 111 toward the front or yarn discharging side 112 of the creel $C^1$. Thus, the yarn packages $115^e$ of the rear row are located adjacent to the bottom of the creel, and the yarn packages $115^h$ of the front row are located in a plane below the plane of the yarn packages $115^a$ of the upper assemblage, the yarn packages $115^f$ and $115^g$ of the intermediate groups being so located with respect to the rear row of yarn packages $115^e$ and the front row of yarn packages $115^h$ that the axes of the four rows of yarn packages of the lower assemblages are in a substantially straight line which is at an angle with respect to the horizontal base of the creel, and which is also substantially parallel with respect to the inclined line of axes of the upper assemblage of yarn packages. In this way the row of yarn packages $115^a$ is arranged in spaced relation directly above the row of yarn packages $115^e$, the row of yarn packages $115^b$ is arranged in spaced relation directly above the row of yarn packages $115^f$, the row of yarn packages $115^c$ is arranged directly above the row of yarn packages $115^g$, and the row of yarn packages $115^d$ is arranged directly above the row of yarn packages $115^h$, and with the yarn packages $115^h$ arranged in a plane lower than the plane of the yarn packages $115^a$, so that the several rows of yarn packages are vertically spaced apart, the row of yarn packages $115^d$ being located at the uppermost portion of the creel, and the row of yarn packages $115^e$ being located at the lowermost portion of the creel, whereby the ends of yarn from the several packages will be spaced apart relative to each other to provide ample clearance spaces therebetween.

The yarn package supporting brackets and associated parts are similar in construction with the construction of the brackets 20, and each rod 123, which provides means for supporting one end of the brackets 120, is mounted in the creel in the manner heretofore described.

Likewise, associated with each group of yarn packages is a yarn package drive drum 136, which is arranged to support and rotate the yarn packages of the group in a manner similar to the construction of the drums 36 heretofore described.

The several drive drums are indicated at $136^a$, $136^b$, $136^c$, $136^d$, $136^e$, $136^f$, $136^g$ and $136^h$.

These drive drums are respectively mounted on rotatable shafts $137^a$, $137^b$, $137^c$, $137^d$, $137^e$, $137^f$, $137^g$ and $137^h$ located within the creel and which extend through the end transverse frame member 101 and have their outer end portions provided with sprockets $139^a$, $139^b$, $139^c$, $139^d$, $139^e$, $139^f$, $139^g$ and $139^h$ respectively.

An endless chain 140 is arranged with all the sprockets in the manner illustrated in FIG. 17, in combination with free running idler sprockets 141 and an adjustable idler sprocket 142, which latter sprockets are provided for the purpose of maintaining the chain at a desired tension.

At the yarn discharging side 112 of the creel there are vertically disposed yarn guide rollers 144. The rollers 144 are generally similar in construction to the rollers 44 heretofore described, and they are rotatably supported by means of bearings 162 carried by the upper bar 148 and by bearings 163 carried by the lower bar 150. The upper bar 148 is mounted on upper brackets 145, and the lower bar 150 is mounted on lower brackets 147. Since the length of the rollers 144 is less than the length of the rollers 44, in this form of creel it is not necessary to provide the vibration dampening elements intermediate the length of the rollers for the purpose heretofore described.

The upper end of each roller 144 has a sprocket 170 mounted thereon. The rollers 144 are rotated in the manner heretofore described by driving means from the yarn package operating mechanism to the roller operating means having a sprocket 171 arranged as shown in FIG. 17. This driving means includes a grooved pulley 180 mounted on the shaft $137^b$, a power transmitting unit 181 having a grooved pulley 182 mounted on a horizontally disposed shaft 183 and operatively connected to the pulley 180 by means of an endless belt 186.

The power transmitting unit 181 has a sprocket 184 mounted on a vertically disposed shaft 185, and mechanism for operatively connecting the shafts 183 and 185 whereby rotation of the shaft 183 imparts rotation to the shaft 185. An endless chain operatively connects the sprocket 184 with the sprocket 188 mounted above the sprocket 171 heretofore referred to.

An adjustable belt tightening device 190 is mounted on the creel frame member 101 in the manner illustrated in FIG. 17. The device 190 has an idler wheel 191 engaging the drive belt 186 to maintain said belt at the desired tension.

It will be noted that the arrangement of the rollers 144 with respect to the arrangement of the yarn packages 115 is such that the yarns 193 from the yarn packages are supported by said rollers in the manner illustrated in FIG. 18, whereby each end of the yarn is placed a little beyond the yarn directly above it, as has been heretofore described.

Referring to FIGS. 19 to 26 inclusive, the warper W comprises a frame having a pair of vertically disposed side walls 201 and 202, said side walls being spaced apart a suitable distance and being connected together by means of a plurality of elongated tie bolts or rods 203, arranged in suitable spaced relation transversely of the warper.

At the side of the warper frame having the wall 202, there is a housing 204 for enclosing certain operating elements and associated parts to be hereinafter referred to.

Between the side walls 201 and 202, the front portion of the warper frame is generally open to provide space therein for certain elements presently described. At the rear and at one side the warper is provided with an end wall 205. Within the lower portion of the warper adjacent to the junction of the walls 201 and 205, there is a second housing 206 which comprises vertical walls 207, 208, 209 and 210, the wall 210 being removably secured to the warper in the manner shown in FIG. 24.

Supported by the two side walls 201 and 202 and arranged transversely across the top of the warper frame, in suitable spaced apart relationship from the rear toward the front, are yarn gathering rolls 211 and 212, an expansion comb device 213 of conventional zig-zag type having an adjustable traverse, and a yarn deflecting roll 214. The expansion comb device 213 may be of the conventional type made and sold for use on warper units by the Steel Heddle Manufacturing Co. of Philadelphia, Pa.

The ends of the yarn gathering rolls are provided with shafts which are journalled in bearings 215 in such manner that both rolls are freely rotatable, the upper roll 211 being mounted so as to be vertically movable relative to the lower roll 212. In this manner the said rolls can be slightly spaced, as shown, so that the yarn is in the form of a yarn sheet that comes from the creel C and passes between the two rolls.

One end of the shaft of the yarn deflecting roll 214 is journalled in a bearing 228 mounted on the side wall 201. At the opposite end of said yarn deflecting roll 214 the shaft thereof is journalled in a bearing 229 mounted on the side wall 202 and this end of the shaft of the yarn deflecting roll 214 is operatively connected to a meter 230 of a standard or conventional type, as indicated in FIG. 19, said meter being arranged to register by yards the length of the yarn sheet passing across or over the yarn deflecting roll 214.

The side wall 201 of the warper frame is provided with a forwardly extending portion 231, and the side wall 202 of said warper frame is provided with a forwardly extending portion 232. The portions 231 and 232 are arranged at the bottom of the warper frame and constitute shelves at the front of the warper upon which are mounted bearings 233 and 234, respectively.

Journalled in the bearings 233 and 234 and arranged transversely of the warper, is a rock shaft 235.

Secured to the shaft 235, at a suitable point inwardly from the bearing 233, is the lower end 236 of an arm 237. Secured to the shaft 235, at a suitable point inwardly from the bearing 234, is the lower end 238 of an arm 239.

As indicated in FIG. 20, the lower end portions 236 and 238 of the arms 237 and 239 may be fixedly secured to the shaft 235 by suitable means, such as by pins or set screws 240.

The two arms 237 and 239 normally extend in a substantially vertical direction from the rock shaft 235, said arms being arranged in parallel relationship with each other so that the upper ends thereof are in alignment in a transverse direction at the front of the warper.

The upper end of the arm 237 is enlarged to provide a head or boss 242, and the upper end of the arm 239 is enlarged to provide a head or boss 243. The head or boss 242 is formed with a socket or notch 244, and the head or boss 243 is formed with a socket or notch 245. The sockets or notches 244 and 245 are so formed in the heads at the upper ends of the arms 237 and 239, respectively, that said sockets or notches face each other and provide the means for receiving the ends of axles 246 projecting from the barrel 248 (see FIG. 25) of a warp beam 250, whereby said warp beam is rotatably supported on said arms. A set screw 251 is mounted in each head or boss for engaging a suitable element adapted to removably hold the warp beam axles 246 in position in a conventional manner.

The construction and arrangement of the parts just described is such that the warp beam 250 is supported by the arms 237 and 239 for swinging movement in a direction toward and from the interior of the warper in an arc having the axis of the rock shaft 235 as its center.

Mounted on the side frames 201 and 202 are bearings 256 and 257, respectively, which provide means in which are journalled the end portions of a shaft 259 of a driving drum 260, for the warp beam.

The driving drum 260 which has its exterior surface provided with a coating of suitable frictional material 261, FIG. 22, is positioned within the warper frame with its axis arranged substantially in parallel relation with the axis of the warp beam 250, the axis of said driving drum being located in a plane lower than the axis of the warp beam for a purpose to be hereinafter more fully described.

An electric motor 270 provides the power for driving certain elements or parts of the creel and warper units, such as the yarn package drive drums 36 and the yarn guide rollers 44 of the creel unit C, and the driving drum 260 of the warper unit W. In order that said elements and units can be operated at various predetermined speeds, the electric motor 270 is of a conventional General Electric five horsepower D.C. variable speed type, which has cooperatively associated therewith suitable control means hereinafter identified.

The motor 270 has a shaft 271 on one end of which is secured a pulley 272 having a plurality of grooves formed circumferentially therein. This pulley 272 is operatively connected to a multi-grooved pulley 273 on a countershaft 274, by means of endless belts 275 (see FIGS. 23 and 24).

The countershaft 274 is rotatable in bearings 276 mounted on the end wall 205 and extends from the rear portion of the warper frame into the housing 204 where it is provided with the pulley 273.

Also mounted on the countershaft 274 is a sprocket 278 which is operatively connected to a sprocket 279 on a shaft 280, by means of an endless chain 281.

The shaft 280 is rotatable in bearings 282 and 283 mounted respectively on the walls 202 and 208, and is arranged transversely of the warper, terminating at one end in the housing 204 wherein the sprocket 279 is located, and terminating at the other end in the housing 206.

Within the housing 206 there is a chain of gears comprising a gear 285 fixedly mounted on the shaft 280 and having teeth in meshing relationship with the teeth of a gear 286 on a shaft 287. Also on the shaft 287 and rotatable with the gear 286, is a gear 288 having teeth in meshing relationship with the teeth of a gear 289 on a shaft 290 rotatable in a bearing 291 mounted on the housing wall 208.

The shaft 290 extends from the housing 206 through the wall 208 where it carries a bevel gear 293 having teeth in meshing relationship with the teeth of a bevel gear 294. The bevel gear 294 is mounted on a shaft 295 supported in bearings 296 and 297 and extends lengthwise of the warper unit in a direction substantially at right angles with respect to the shaft 280. The bearing 297 for the shaft 295 is mounted on the exterior of the wall 205 in the manner shown in FIG. 24, and beyond said bearing the shaft 295 is connected by a universal joint element 299 to one end of a creel unit drive shaft 300.

As shown in FIG. 3, the creel drive shaft 300 is connected by a universal joint element 301 to the end of the shaft 37$^d$, whereby the creel drive mechanism heretofore described is actuated by the variable speed electric motor 270 through the motion transmitting means just described.

As shown in FIGS. 23 and 24, one end of the shaft 259 of the warp beam driving drum 260 extends into the housing 204, where it has a sprocket 305 fixedly mounted thereon.

Mounted on the shaft 280 is a sprocket 306 which is operatively connected with the sprocket 305 by means of an endless chain 307.

A chain tensioning idler 308 is cooperatively associated with the chain 307, which idler is adjustably mounted on the end wall 202 by an arrangement indicated at 309 in FIG. 23, so that the chain 307 can be maintained at the desired tension.

The construction and arrangement of the parts just described is such that rotation imparted to the shaft 280 by the electric motor 270 is transmitted to the warp beam driving drum 260, by the sprocket 306, the chain 307, and the sprocket 305, whereby said driving drum 260 may be rotated at any desired number of revolutions per minute within the driving speed range of the motor 270.

Means are provided for indicating the surface speed of the warp beam driving drum 260 in yards per minute, said indicating means comprising a tachometer 311 of standard or conventional construction, which is mounted on a front instrument panel 312 of the housing 204. The tachometer 311 may be of the type made and sold by the Boulin Instrument Corp. of Pelham, New York, and identified as model 3H4, Serial No. 20004, ratio 129–20.

The tachometer 311 is operatively connected to a drive gear 314 fixedly mounted on the drum shaft 259, by means of a flexible cable 315 leading from the tachometer 311, and having the teeth of a gear 316 at its opposite end in meshing relationship with the teeth of the gear 314, as more particularly illustrated in FIG. 23.

By reference to FIG. 23 it will also be seen that means are provided for controlling the traverse of the expansion comb 213 in accordance with changes in the operating speed of the warp beam driving drum 260, said means comprising a variable speed unit 320 of the conventional type made and sold by Revco Incorporated of Minneapolis, Minnesota, and identified as "Zero-Max model 142X–CW. Speed range r.p.m. 0–¼ input." Such a unit is provided with a sprocket 321 that is connected to a sprocket 322 on the shaft 259 of the driving drum 260, by means of an endless chain 323. The variable speed unit 320 is connected to the traverse adjustment means of the comb 213 by a stroke determining element generally indicated at 325, by gearing including a worm and worm gear arrangement indicated at 326.

The operation of the variable speed unit 320 is manually controlled by means of a hand wheel 327 mounted on the front panel 312 and connected to a screw threaded shaft 328 by a rod 329. Mounted on the threaded shaft 328 is a nut 330 carried by one end of an arm 331 of the adjustment means of the variable speed unit.

The construction and arrangement of the parts just described is such that rotation of the hand wheel 327 effects movement of the nut 330 lengthwise of the threaded shaft 328 thereby shifting the position of the arm 331 to actuate the unit to vary the traverse of the comb 213 in a manner well known in the art.

For the purpose of simultaneously operating the arms 237 and 239 of the warp beam supporting means heretofore described, one end of the rock shaft 235 is arranged within the housing 204 where it has mounted thereon a gear 335 having its teeth in meshing relationship with the teeth of a rack bar 336. The rack bar 336 is slidably mounted in a suitable support element 337 fixedly arranged at the location shown best in FIGS. 23 and 24.

Extending downwardly from the front end of the rack bar 336 and also extending in a lateral direction therefrom, is a bracket 338, to the lower extremity of which is connected the forward end of a piston rod 340 of fluid pressure operating means comprising a cylinder 341, having a piston 342 therein (see FIG. 27) on the inner end of the rod 340. The said fluid pressure operating means may comprise a standard type cylinder unit, such as made and sold by the Bellows Valvair Corp. of Akron, Ohio, and identified as "Bellows Air Motor—model BM15."

Fluid under pressure, which may be either air, water, or oil, the preferred fluid being air, is fed into the chamber sections 344 and 345 of the cylinder 341 that are located at each side of the piston 342, by means of pipes 346 and 347 which, respectively, communicate with the two ends of said cylinder 341.

Forming part of the fluid pressure operating mechanism and arranged to check the movements of the piston 342 in the cylinder 341, is a cushioning means in the form of a shock absorber device of a conventional hydraulic type having a cylinder 350 for containing fluid and a piston (not shown) on one end of a piston rod 351. The said shock absorber device may be of the conventional type made and sold by the Gabriel Manufacturing Co. of Cleveland, Ohio, and identified as "Gabriel Adjustable No. 45014."

The outer end of the piston rod 351 is pivotally connected, as indicated at 352, to the bracket 338, and the rear end of the cylinder 350 is pivotally connected, as indicated at 353, to a plate 354 constituting an extension of the rack bar supporting element 337, as illustrated in FIGS. 23 and 24.

As indicated in FIG. 23 and more particularly shown in FIG. 27, for the purpose of controlling the operation of the piston 342, a suitable control valve device 356 is provided, which may be of the conventional type made and sold by the Bellows Valvair Corp. of Akron, Ohio, and identified as "Model 92–28–3–20–F lever operated panel mount control valve."

The chamber section 345 on one side of the piston 342 is connected to the chamber section 357 of the control valve device 356 by pipe 347. The chamber section 344 on the opposite side of the piston 342 is connected to a chamber section 358 of the control valve device 356 by pipe 346.

The control valve device 356 is also provided with a chamber section 359, and the chamber sections 357 and 359 are connected to atmosphere, by a pipe arrangement 360.

Air under pressure is supplied to the intermediate chamber section 358 of the control valve device 356, through a pipe 361 which leads from a suitable source of air pressure supply (not shown).

The air under pressure thus supplied to the chamber 358 is alternately supplied to the piston chambers 344 and 345 respectively, by means of a pilot valve 362, which is operatively connected to a valve actuator element 363 by means of a rod 364.

In order to maintain the air supplied to the control valve device 356 under a predetermined pressure, an air pressure regulator 365 is connected to the pipe 361. The air pressure regulator 365 is of a conventional manually adjustable type having a handle for operating the regulator so as to establish the desired air pressure, and in order to determine the pressure of air attained by operation of the handle of the air pressure regulator 365, an air pressure indicating gauge 366 is also connected to the pipe 361.

As shown in FIGS. 19 and 20, the air pressure regulator 365 and the air pressure indicating gauge 366 may be mounted on the front panel 312 in view of the operator of the appaartus. Mounted at the top of the housing 204, at a point adjacent to the meter 230, is the actuator element 363 for operating the control valve device 356.

As shown in FIG. 27, suitable means are provided for controlling the operation of the D.C. electric motor 270, by electric current from a source of supply of alternating current from lines $L^1$, $L^2$, and $L^3$, such means comprising a standard disconnect switch device 370, a standard starter switch device 371, and a standard A.C. to D.C. converter device 372, all electrically connected together in the manner illustrated. The converter device 372 may be of the conventional type made and sold by the General Electric Company of Schenectady, New York, and identified as "Thy-mo-trol panel model F211DC–5 H.P."

A two-point starter switch 373, having a push button 374, is electrically connected to the starter device 371, by wires 375 and 376.

A stop switch 377, having a push button 378, is electrically connected to the starter device 371, by wires 379 and 380.

The panel light 381 is electrically connected to the starter device 371, by wires 382 and 383, so that when the light 381 is "on" it will indicate whether the units electrically connected with the starter device 371 are energized.

A rheosat 385 is electrically connected to the A.C.-D.C. converter device 372, by wires 386 and 387, said converter device 372 being also electrically connected to the D.C. motor 270, by wires 388 and 389.

As indicated in FIGS. 19 and 20, the push buttons 374 and 378 of the switches 373 and 377, respectively, the panel light 381, and the rheostat 385, are mounted on the panel 312 in view of the operator of the apparatus.

It has heretofore been described that the creel unit C is threaded with the yarns 93 from the plurality of yarn packages 15, so that the yarns emanate from the yarn discharging side 12 of the creel unit in the form of a yarn sheet which is of substantially the same width as the width of the yarn reeciving surface of the warp beam 250 provided by the barrel 248.

With the warp beam 250 of the warper unit W arranged in the dot-and-dash loading position, indicated by the letter L in FIG. 22, in which position the warp beam is freely rotatable and arranged in suitable spaced relation relative to the driving drum 260 (see also FIG. 27), the ends 93 of the yarn in the yarn sheet from the creel unit C, are first led between the gathering rolls 211 and 212 of the warper. From the gathering rolls 211 and 212 the yarn is taken through the expansion comb 213, then around the deflecting roll 214, and has its ends attached to the barrel 248 of the warp beam 250 in the usual well known manner.

The ends of the yarn going through the expansion comb 213 are divided to have equal spaces across the face of the warp beam barrel 248 to insure proper spool build up.

The adjustment of the expansion comb 213 is usually across the face of the beam and the yarn is spaced equally between the teeth in relation to the entire face of the beam. The traverse is then adjusted to effect a smooth roll, in the well known manner of the art.

It will be noted that the yarn discharging side 12 of the creel C is arranged at such an acute angle with respect to the axis of the warp beam 250, that the formation of the yarn sheet is accomplished in such manner as to spread the yarn sheet over the full width of the warp beam 250, as illustrated in FIG. 1, with little or no deflecting of the yarn taking place in the expansion comb 213 and very little, if any, rubbing contact of the yarn 93 with the teeth of the comb 213.

In the loading position of the warp beam 250 referred to above, the piston chamber 345 of the cylinder 341 is connected through the control valve device 356, to atmosphere through the pipe 347, chamber 357 of the control valve device, and pipe 360. At the same time, the piston chamber 344 is supplied with air under pressure from the pipe 361, through chamber 358 of the control valve device 356, and pipe 346.

After the yarn is threaded into the warper in the manner above described, the valve actuator element 363 is operated to shift the pilot valve 362 from the full line to the dotted line position shown in FIG. 27.

With the position of the pilot valve 362 thus shifted, the piston chamber 344 will be connected to the atmosphere through the pipe 346, the chamber 357 and the pipe 360, and the piston chamber 345 will be supplied with fluid under pressure from the pipe 361, through the chamber 358 and the pipe 347, thereby moving the piston 342 and the rack bar 336 toward the left.

Movement of the rack bar 336 toward the left turns the gear 335, the rock shaft 235 and the warp beam 250 carried by the arms 237 and 239 which are fixed to said rock shaft, from the loading position indicated by the letter L in FIGS. 22 and 27, to a position in which the warp on the warp beam is against the surface of the driving drum 260, as also indicated in said figures.

The warp beam will thus be held in position against the driving drum 260 by air pressure acting against the side of the piston 342 in the chamber 345.

With the rheosat 385, FIG. 27, set at zero r.p.m., the push button 374 is actuated to close the switch 373, thereby closing the electric circuit through the starter switch 371, by which the A.C.-D.C. converter 372 is energized.

Since the panel light 381 is electrically connected to the starter switch 371 by the wires 382 and 383, said panel light will be illuminated to indicate that the warper unit is energized.

The rheostat 385 is then actuated to increase the amount of electric current supplied to the motor 270 by the A.C.-D.C. converter 372 until the surface speed of the warp beam driving drum 260, which is directly connected to said motor 270 by the driving connections heretofore described, is at the desired rate, as indicated by the tachometer 311.

Since the ends of the yarn of the yarn sheet which have been initially wound on the barrel 248 of the warp beam 250, are in contact with the surface 261 of the driving drum 260, rotation of said driving drum turns the warp beam, which is held against the driving drum by fluid under pressure in the manner heretofore described, so that the ends of the yarn are wound on the warp beam barrel 248.

As soon as the first few layers of yarn are applied to the warp beam 250, the variable speed unit 325 is adjusted to the correct amount of lay by adjusting the hand wheel 327 (indicated in FIGS. 19, 20, 23 and 27).

When the yarn beam is finished, either by being full or by actual yardage taken from the deflecting roll 214, as indicated by the meter 230 (FIGS. 19, 20 and 23), the warper is stopped by turning the rheostat 385 back to zero r.p.m.

The warp beam 250 is then swung from the winding position against the driving drum 260 illustrated in FIG. 22, to the loading and unloading position indicated by the letter L in FIGS. 22 and 27, in which the warp beam is arranged suitably spaced apart from the driving drum 260. The yarn sheet is then parted for doffing of the warp beam 250, after which the warp beam loading operation is repeated while the warper unit W is energized as indicated by the panel light 381. However, if additional beams are not required, the A.C.-D.C. converter 372 is de-energized by operating the push button 378 of the stop switch device 377.

The apparatus of the present invention is primarily adapted to be used for the preparation of warp beams containing multifilament or no filament synthetic elastic fiber yarns of spandex sold under the trademark "Lycra". It can also be used to advantage for soft stretch rubber yarns. The physical properties of these yarns are such that the yarns, being of an elastic nature, stretch to a considerable extent from the moment they pass from the yarn packages 15 of the creel until they are wound on the warp beam 250. Therefore, in order to prevent excessive friction, the generation of heat, and detrimental static buildup, with resultant fibrillation and ultimate breakdown, the creel unit C is operatively connected to the warper unit W, by means of the drive shaft 300, so that the yarn package drive drums 36 of the creel unit rotate the yarn packages 15 to cause the yarn to unwind from the yarn packages at a predetermined surface speed which maintains the yarn taut as it moves past the yarn deflecting rolls 44 which are operating at a controlled ratio of the surface speed of the yarn packages 15 and the surface speed of the warp beam 250. In this manner, the yarn sheet from the creel unit, which is spread over the full width of the warp beam, with little or no deflecting taking place in the expansion comb 213, will be wound on the warp beam under a predetermined tension which insures the desired spool build-up.

In order that the ratio at which the yarn package drive drums 36 of the creel unit operate with respect to the surface speed of the warp beam driving drum 260, can be varied to suit the amount of stretch imparted to yarns having various elastic properties, the gears 285, 286, 288 and 289 heretofore described are so constructed and arranged that the speed ratio of the shaft 300 with respect to the shaft 280 can be changed by substituting other gears therefor having different speed ratios arranged to impart the desired driven speed to the creel unit.

Referring to FIGS. 8 and 9, the manner in which the yarn packages 15 are suspended from the rods 23 in relation to the longitudinal axes of the drive drums 36 is controlled by the arms 20. It will be noted that the yarns 93 leave the yarn packages 15 at point indicated by the arrow 393 and leave the drive drums 36 at point indicated by the arrow 394. One of the reasons for arranging the parts in this manner is to allow the surfaces of the drive drums 36 to hold back the yarns without the strain of the yarns being on the yarn packages 15. When the strain of the yarns are on the yarn packages 15, the yarn has a tendency to lock itself between the winds of the packages, thereby causing breakage of the yarn fibers. During operation of the warper unit W, as the yarn packages 15 diminish in size, the outer ends of the arms 20 swing downwardly in an arc having the axis of the rods 23 as a center, and this movement increases the contact area to the point indicated by the arrow 395 in FIG. 9. Thus, as the yarn packages 15 diminish in weight, the contact areas of the yarns are increased on the drive drum surfaces, thereby preventing the yarn packages from pulling off yarn through slippage. Also, because of the angle, pressure is increased when applied at the point 395, FIG. 9, which in turn overcomes the diminishing weight of the yarn packages. This feature of the improvements embodied in the apparatus of the present invention, is extremely important when a spandex or similar type yarn is involved, and stretch is taking place, because the packages of spandex yarn, being occasionally uneven, will otherwise bounce while rotating and spin yarn off of the packages at an uncontrolled rate.

Referring to FIG. 25, it will be noted that the arrangement of the parts there shown is such that the ends of the yarn from the deflecting roll 214 contact the warp beam barrel 248 at a point 396 above the nip point 397 the driving drum 260 makes contact with the yarn. By this arrangement the yarn is laid on the warp beam barrel in advance of making direct contact with the surface of the driving drum 260 and, consequently, the desired spool build-up is attained without laying the yarn on the warp beam barrel in such manner as to cause the yarn to lock itself between the winds of the warp.

Of course, it will be understood by those skilled in this art that the improvements specifically shown and described can be changed and modified in various ways without departing from the invention herein disclosed and hereinafter more particularly indicated and defined by the appended claims.

I claim:

1. An apparatus of the character described comprising in combination; a creel unit having a yarn discharging area; a plurality of yarn packages; means for mounting said yarn packages on the creel unit in different vertical planes so as to enable travel of the yarns therefrom to the yarn discharging area in a certain vertically arranged relatively spaced order; an elongated yarn deflecting element arranged to extend vertically across said yarn discharging area, which element is adapted to have the respective yarns from the yarn packages contactingly positioned at different points along its surface in such manner as to effect similar angular deflection of the yarns at said yarn discharging area and travel of the yarns from the latter in a substantially uniformly spaced parallel relationship with each other so as to combinedly form a yarn sheet formation of a predetermined width; a warper unit cooperatively associated with the creel unit at a loctaion beyond one end of the latter; a warp beam rotatably mounted on the warper unit for receiving said yarn sheet formation, the longitudinal axis of which warp beam is arranged in a certain acute angular relation with the longitudinal axis of said creel unit whereby the yarn sheet formation is enabled to travel in right-angular relation to the warp beam from the creel unit; and power means for effecting rotation of said warp beam.

2. An apparatus of the character described comprising in combination; a creel unit having a yarn discharging area; a plurality of yarn packages; means for rotatably mounting said yarn packages on the creel unit in different vertical planes so as to enable travel of the yarns therefrom to the yarn discharging area in a certain vertically arranged relatively spaced order; a rotatably mounted elongated yarn deflecting roller arranged to extend vertically across said yarn discharging area, which roller is adapted to have the respective yarns from the yarn packages contactingly positioned at different points along its surface in such manner as to effect similar angular deflection of the yarns at said yarn discharging area and travel of the yarns from the latter in a substantially uniformly spaced parallel relationship with each other so as to combinedly form a yarn sheet formation of a predetermined width; a warper unit cooperatively associated with the creel unit at a location beyond one end of the latter; a warp beam rotatably mounted on the warper unit for receiving said yarn sheet formation, the longitudinal axis of which warp beam is arranged in a certain acute angular relation with the longitudinal axis of said creel unit whereby the yarn sheet formation is enabled to travel in right-angular relation to the warp beam from the creel unit; and power means arranged to effect simultaneous rotation of said yarn packages, elongated yarn deflecting roller and warp beam.

3. An apparatus of the character described comprising in combination; a creel unit having a yarn discharging area; a plurality of yarn packages; means for rotatably mounting said yarn packages on the creel unit in different vertical planes so as to enable travel of the yarns therefrom to the yarn discharging area in a certain vertically arranged relatively spaced order; a rotatably mounted elongated yarn deflecting roller arranged to extend vertically across said yarn discharging area, which roller is adapted to have the respective yarns from the yarn packages contactingly positioned at different points along its surface in such manner as to effect similar angular deflection of the yarns at said yarn discharging area and travel of the yarns from the latter in a substantially uniformly spaced parallel relationship with each other so as to combinedly form a yarn sheet formation of a predetermined width; a warper unit cooperatively associated with the creel unit at a location beyond one end of the latter; a warp beam rotatably mounted on the warper unit for receiving said yarn sheet formation, the longitudinal axis of which warp beam is arranged in a certain acute angular relation with the longitudinal axis of said creel unit whereby the yarn sheet formation is enabled to travel in right-angular relation to the warp beam from the creel unit; a variable speed motor mounted on the warper unit; motion transmitting means arranged between the motor and said yarn deflecting roller; motion transmitting means arranged between said motor and said warp beam; and control means for effecting operation of said motor at a selectively determined speed.

4. An apparatus of the character described comprising in combination; a creel unit having a yarn discharging area; a plurality of yarn packages; means for rotatably mounting said yarn packages on the creel unit in different vertical planes so as to enable travel of the yarns therefrom to the yarn discharging area in a certain vertically arranged relatively spaced order; a rotatably mounted elongated yarn deflecting roller arranged to extend vertically across said yarn discharging area, which roller is adapted to have the respective yarns from the yarn packages contactingly positioned at different points along its surface in such manner as to effect similar angular deflection of the yarns at said yarn discharging area and travel of the yarns from the latter in a substantially uniformly spaced parallel relationship with each other so as to combinedly form a yarn sheet formation of a predetermined width; a warper unit cooperatively associated with the creel unit at a location beyond one end of the latter; a warp beam rotatably mounted on the warper unit for receiving said yarn sheet formation, the longitudinal axis of which warp beam is arranged in a certain acute angular relation with the longitudinal axis of said creel unit whereby the yarn sheet formation is enabled to travel in right-angular relation to the warp beam from the creel unit; a variable speed motor mounted on the warper unit; drive means for effecting simultaneous rotation of said yarn packages and yarn deflecting roller; variable speed means interposed between said drive means and motor; motion transmitting means arranged between said motor and said warp beam; and control means for effecting operation of said motor at a selectively determined speed.

5. An apparatus of the character described comprising in combination; a creel unit having a yarn discharging area; a plurality of axially aligned groups of rotatably mounted yarn packages; means for mounting the groups of yarn packages on the creel unit in different vertical planes so as to enable travel of the yarns therefrom to the yarn discharging area in a certain vertically arranged relatively spaced order; a plurality of rotatably mounted elongated yarn deflecting rollers arranged to vertically extend in relatively spaced order across said yarn discharging area, which rollers are adapted to have the respective yarns from the yarn packages contactingly positioned at different points along their surfaces in such manner as to effect similar angular deflection of the yarns at said yarn discharging area and travel of the yarns from the latter in a substantially uniformly spaced parallel relationship with each other so as to combinedly form a yarn sheet formation of a predetermined width; a warper unit cooperatively associated with the creel unit at a location beyond one end of the latter; a warp beam rotatably mounted on the warper unit for receiving said yarn sheet formation, the longitudinal axis of which warp beam is arranged in a certain acute angular relation with the longitudinal axis of said creel unit whereby the yarn sheet formation is enabled to travel in right-angular relation to the warp beam from the creel unit; and power means for effecting simultaneous rotation of said groups of yarn packages, said yarn deflecting rollers and said warp beam.

6. An apparatus in accordance with claim 5, wherein said power means is in the form of a variable speed motor that is mounted on the warper unit.

7. An apparatus in accordance with claim 5, wherein said power means is in the form of a variable speed motor that is mounted on the warper unit, and which apparatus includes variable speed means in interposed relation between said motor, the groups of yarn packages and the yarn deflecting rollers.

8. An apparatus in accordance with claim 5, wherein the warper unit includes a driving drum having a barrel; two relatively spaced arms for rotatably supporting the ends of the warp beam with its barrel in contact with the drum throughout the length of said barrel; a shaft on which said arms are fixedly mounted; a circular gear secured to said shaft; an elongated gear rack in meshing engagement with said circular gear; a reciprocatively operable fluid-pressure-actuated member connected with said gear rack for effecting movement of the latter in both directions; and valve means for controlling the extent of movement of said member in both directions.

9. An apparatus in accordance with claim 5, wherein the warper unit includes a driving drum having a barrel; means for rotatably supporting the ends of the warp beam with its barrel in contact with the drum throughout the length of such barrel; and a rotatably mounted yarn deflecting roller over which the yarn sheet formation passes in its travel to the warp beam, which roller is so located in relation to the warp beam and driving drum that the yarn sheet traveling from said roller to the warp beam will contact the winding surface of the warp beam at a certain distance from the nip point of the driving drum.

10. An apparatus in accordance with claim 5, wherein the creel unit includes a plurality of driving drums each of which is arranged to effect rotation of one of the said groups of axially aligned yarn packages, the said drums being arranged in such driving contact with the yarn packages that the yarn strand that travels from a respective yarn package to its contact position on the surface of a yarn deflecting roller will ride a certain distance along the surface of the driving drum beyond the nip point of the latter.

11. An apparatus of the character described comprising a creel unit having a yarn discharging area; a plurality of yarn packages; means for mounting said yarn packages in different vertical planes so as to enable travel of the yarns therefrom to the yarn discharging area in a certain vertically arranged relatively spaced order; and rotatably mounted yarn deflecting means arranged to extend vertically across said yarn discharging area and to rotate about its own axis, which means is adapted to have the respective yarns from the yarn packages contactingly positioned at different surface points therealong in such manner as to effect similar angular deflection of the yarns at said yarn discharging area and travel of the yarns from the latter in substantially uniformly spaced parallel relationship with each other so as to combinedly form a yarn sheet formation of a predetermined width.

12. An apparatus in accordance with claim 11, wherein said rotatably mounted yarn deflecting means is in the form of a roller having bearings therefor located at the upper and lower ends of the yarn discharging area.

13. An apparatus in accordance with claim 11, wherein both the yarn packages and the yarn deflecting means are rotatably mounted.

14. An apparatus in accordance with claim 11, wherein both the yarn packages and the yarn deflecting means are rotatably mounted, and which creel unit includes means for rotating said packages and yarn deflecting means in synchronism with each other.

15. An apparatus in accordance with claim 11, wherein both the yarn packages and the yarn deflecting means are rotatably mounted, and which creel unit includes means for effecting rotation of said yarn packages and said yarn deflecting means at different rates of speed.

16. An apparatus in accordance with claim 11, wherein the yarn packages are rotatably mounted; and which creel unit includes a driving drum for each of the yarn packages, each of which drums is arranged in such contacting relation with its respective yarn packages that the yarn strand that travels from a respective yarn package to its contact position on the surface of the yarn deflecting means will ride a certain distance along the surface of the driving drum beyond the nip point of the latter.

17. An apparatus of the character described comprising: a warp beam having a barrel; a driving drum; two sectionally spaced arms for rotatably supporting the ends of the warp beam with its barrel in contact with the drum throughout the lentgh of such barrel; a shaft on which said arms are fixedly mounted; a circular gear secured to said shaft; an alongated gear rack in meshing engagement with said gear; a reciprocatively operable fluid-pressure-actuated member connected with said rack for effecting movement of the latter in a recoprocating manner along its longitudinal axis; and valve means for controlling the extent of movement of said member in a reciprocating manner.

18. An apparatus which is designed to transfer individual yarns that are respectively wound on separate yarn packages onto a warp beam, which apparatus comprises in combination:

(a) a creel unit having a yarn discharging area, (b) a plurality of yarn packages that are rotatably mounted on said creel unit in different vertical planes so as to enable travel of the yarns therefrom to the yarn discharging area in a certain vertically arranged relatively spaced order, (c) a plurality of elongated yarn deflecting rollers arranged to extend vertically across said yarn discharging area, (d) self-aligning bearings arranged along the upper and lower borders of said yarn discharging area in which certain outer end portions of said yarn deflecting rollers are rotatably mounted, (e) a warper unit cooperatively associated with the creel unit at a location beyond one end of the latter, (f) a warp beam rotatably mounted on the warper unit, the longitudinal axis of which warp beam is in acute angular relation with the longitudinal axis of said creel unit, and (g) power means for effecting simultaneous rotation of said yarn packages, yarn deflecting rollers and warp beam.

19. An apparatus in accordance with claim 18, which includes variable speed means that is operatively arranged to enable the warp beam to be rotated by the power means at one rate of speed and the yarn packages and yarn deflecting rollers to be rotated by the power means at a different rate of speed.

20. An apparatus of the character described comprising: a creel unit having a plurality of yarn packages rotatably mounted thereon; means for rotating said yarn packages to effect travel of their yarns at a predetermined speed to a commn yarn discharging area located at one side of the creel unit; a warper unit positioned beyond one end of said creel unit; a warp beam rotatably mounted on said warper unit and having a yarn receiving surface of predetermined width, the longitudinal axis of which warp beam is arranged in a certain acute angular relation with the longitudinal axis of the creel unit; and a plurality of yarn deflecting elements arranged to vertically extend across said yarn discharging area in such manner that the individual yarns from said yarn packages are contactingly positionable at different points along the surface of said elements for travel therebeyond in a substantially parallel relationship with each other and in such order as to effect a yarn sheet formation of substantially the same width as the width of the yarn receiving surface of said warp beam and one which extends in right-angular relation to said warp beam from said yarn deflecting elements as determined by said certain acute angular relation arrangement between the longitudinal axis of the creel unit and the longitudinal axis of the warp beam.

21. An apparatus in accordance with claim 20, which includes change speed means for effecting rotation of said yarn packages at a different rate of speed than the speed of rotation of said warp beam.

22. An apparatus of the character described comprising, a creel having yarn packages arranged in groups, each group consisting of a plurality of yarn packages arranged in axial alignment with each other, means for rotatably supporting said yarn packages whereby the individual yarns are positioned for travel in spaced apart paths toward a yarn discharging side of the creel, means for simultaneously rotating the yarn packages to cause the yarn to travel therefrom toward the yarn discharging side of the creel at a predetermined surface speed, a warper having a rotatable warp beam for receiving the yarn from the yarn packages, means for rotating the warp beam at a predetermined speed having a definite relation with respect to the speed the yarn travels from the packages, a plurality of rollers arranged at the yarn discharging side of the creel for guiding and supporting yarn from the yarn packages traveling toward the warper, means for rotating said rollers at a predetermined rate of speed whereby the surface speed thereof is in a controlled ratio of the surface speed of the yarn packages and the surface speed of the warp beam, and means operatively connecting the warp beam rotating means of the warper with the yarn package rotating means and the yarn roller rotating means of the creel whereby the yarn from the packages is delivered to the warper in such manner as to effect a build-up on the warp beam of yarn under a predetermined tension.

23. An apparatus of the character described comprising, a creel having yarn packages arranged in groups, each group consisting of a plurality of yarn packages arranged in axial alignment with each other, means for rotatably supporting said yarn packages whereby the individual yarns are positioned for travel in separate spaced apart paths toward a yarn discharging side of the creel which is arranged at a predetermined angle with respect to the axes of the yarn packages, means for simultaneously rotating the yarn packages at a predetermined speed to cause the yarn to travel therefrom toward the yarn discharging side of the creel, a warper having a rotatable warp beam for receiving yarn from the yarn packages, said warp beam having its longitudinal axis arranged at an acute angle with respect to the plane of the yarn discharging side of the creel, means for rotating the warp beam at a predetermined speed having a definite relation with respect to the surface speed of the yarn, a plurality of rollers arranged at the yarn discharging side of the creel for guiding and supporting yarn from the yarn packages traveling toward the warper, said rollers being arranged at an acute angle with respect to the plane of the discharging side of the creel and with respect to the longitudinal axis of said warp beam, and means for rotating said rollers at a predetermined speed whereby the surface speed thereof is in a controlled ratio of the surface speed of the yarn packages and the surface speed of the warp beam so that the yarn is delivered to the warper in such manner as to effect a build-up on the warp beam of yarn under a predetermined tension.

24. An apparatus of the character described comprising, a creel having yarn packages arranged in groups, each group having a plurality of yarn packages arranged in axial alignment with each other, means for rotatably supporting said yarn packages whereby the individual yarns are positioned for travel in separate spaced apart paths toward a common yarn discharging side of the creel which is arranged at a predetermined angle with respect to the axes of said yarn packages, means for simultaneously rotating the yarn packages at a predetermined surface speed to cause the yarn to travel therefrom toward the yarn discharging side of the creel, a warper having a rotatable warp beam for receiving the yarn from the yarn packages, said warp beam having its longitudinal axis arranged at an acute angle with respect to the plane of the yarn discharging side of the creel, means for rotating the warp beam at a predetermined speed having a definite relation with respect to the speed the yarn travels from the packages, a plurality of rollers arranged at the yarn discharging side of the creel for guiding and supporting yarn from the yarn packages traveling toward the warper, said rollers being arranged at an acute angle with respect to the plane of the discharging side of the creel and with respect to the longitudinal axis of said warp beam, means for rotating said rollers at a predetermined rate of speed whereby the surface speed thereof is in a controlled ratio of the surface speed of the yarn packages and the surface speed of the warp beam, and means operatively connecting the warp beam rotating means of the warper with the yarn package rotating means and the yarn roller rotating means of the creel whereby the yarn from the packages is delivered to the warper in such a manner as to effect a build-up on the wap beam of yarn under a predetermined tension.

25. An apparatus of the character described comprising: a creel unit having a plurality of yarn packages rotatably mounted thereon; means for rotating said yarn packages to effect travel of their yarns at a predetermined speed to a common yarn discharging area located at one side of the creel unit; a warper unit positioned beyond one end of said creel unit; a warp beam rotatably mounted on said warper unit, the longitudinal axis of which warp beam is arranged in acute angular relation with the longitudinal axis of the creel unit, said warp beam having a yarn receiving surface of a predetermined width; a series of rotatable elongated yarn guide rollers aranged to extend vertically across said yarn discharging area, each of which rollers has a lengthwise extending yarn guide surface; and means for arranging said rollers so that said lengthwise extending yarn guide surfaces of the successive rollers are combined in a progressively spaced order relative to each other, whereby the individual yarns from said yarn packages are contactingly positionable on said surfaces for travel from said yarn discharging area to the warp beam in such manner as to effect a yarn sheet formation of substantially the same width as the width of the yarn receiving surface of the warp beam.

References Cited in the file of this patent
UNITED STATES PATENTS

| | | |
|---|---|---|
| 1,275,850 | Colman | Aug. 13, 1918 |
| 1,797,391 | Abbott | Mar. 24, 1931 |
| 1,872,179 | Peterson | Aug. 16, 1932 |
| 1,935,242 | Fulton | Nov. 14, 1933 |
| 2,063,752 | Peterson | Dec. 8, 1936 |
| 2,102,680 | Cocker | Dec. 21, 1937 |
| 2,450,431 | Lambach | Oct. 5, 1948 |
| 2,547,072 | Bauer | Apr. 3, 1951 |
| 2,663,067 | Roughsedge et al. | Dec. 22, 1953 |
| 2,685,726 | Furst | Aug. 10, 1954 |
| 2,843,915 | Drake | July 22, 1958 |
| 2,955,897 | Noe | Oct. 11, 1960 |
| 2,963,767 | Freeze | Dec. 13, 1960 |